(12) United States Patent
Xu et al.

(10) Patent No.: US 11,228,967 B2
(45) Date of Patent: Jan. 18, 2022

(54) CONFIGURATION OF COMMON SEARCH SPACES IN A DOWNLINK BANDWIDTH PART

(71) Applicant: QUALCOMM Incorporated, San Diego, CA (US)

(72) Inventors: Huilin Xu, San Diego, CA (US); Peter Pui Lok Ang, San Diego, CA (US); Heechoon Lee, San Diego, CA (US); Keiichi Kubota, Tokyo (JP)

(73) Assignee: QUALCOMM INCORPORATED, San Diego, CA (US)

( * ) Notice: Subject to any disclaimer, the term of this patent is extended or adjusted under 35 U.S.C. 154(b) by 96 days.

(21) Appl. No.: 16/562,024

(22) Filed: Sep. 5, 2019

(65) Prior Publication Data

US 2020/0084705 A1    Mar. 12, 2020

Related U.S. Application Data

(60) Provisional application No. 62/728,617, filed on Sep. 7, 2018.

(51) Int. Cl.
*H04W 48/14* (2009.01)
*H04L 5/00* (2006.01)
(Continued)

(52) U.S. Cl.
CPC .......... *H04W 48/14* (2013.01); *H04L 5/0092* (2013.01); *H04L 5/0094* (2013.01); *H04W 24/08* (2013.01);
(Continued)

(58) Field of Classification Search
CPC ..... H04W 24/08; H04W 76/27; H04W 48/12; H04W 48/14; H04W 72/0493;
(Continued)

(56) References Cited

U.S. PATENT DOCUMENTS

2015/0103800 A1    4/2015 Seo et al.
2018/0048985 A1    2/2018 Park et al.
(Continued)

FOREIGN PATENT DOCUMENTS

CN    107453840 A    12/2017
EP    3554160 A1    10/2019
(Continued)

OTHER PUBLICATIONS

International Search Report and Written Opinion—PCT/US2019/050019—ISA/EPO—dated Dec. 10, 2019.

*Primary Examiner* — Maharishi V Khirodhar
*Assistant Examiner* — Kenneth P Hunt
(74) *Attorney, Agent, or Firm* — Kevin T. Cheatham

(57) ABSTRACT

Methods, systems, and devices for wireless communications are described. A user equipment (UE) may obtain access to a base station by performing an initial access procedure within an initial access bandwidth. In some cases, the UE may monitor for a cell specific configuration in the initial access bandwidth that indicate one or more first common search spaces within the initial access bandwidth that the UE may monitor for control information. Additionally, the UE may receive dedicated signaling after the initial access procedure that indicates a downlink bandwidth part (BWP) and one or more second common search spaces within the downlink BWP to monitor for control information. Accordingly, the UE may monitor the first common search spaces, the second common search spaces, or both based on the dedicated signaling.

40 Claims, 17 Drawing Sheets

(51) Int. Cl.
*H04W 24/08* (2009.01)
*H04W 72/04* (2009.01)
*H04W 76/27* (2018.01)

(52) U.S. Cl.
CPC ....... *H04W 72/0493* (2013.01); *H04W 76/27* (2018.02)

(58) Field of Classification Search
CPC .......... H04W 74/006; H04W 74/0833; H04W 74/00; H04W 74/002; H04W 74/004; H04W 74/008; H04W 74/08; H04W 74/0866–0891; H04L 5/0053; H04L 5/0094; H04L 5/008; H04L 5/0092
See application file for complete search history.

(56) References Cited

U.S. PATENT DOCUMENTS

| | | |
|---|---|---|
| 2018/0199343 A1 | 7/2018 | Deogun et al. |
| 2019/0104416 A1 | 4/2019 | Yerramalli et al. |
| 2019/0141711 A1 | 5/2019 | Fu et al. |
| 2019/0150079 A1 | 5/2019 | Chen et al. |
| 2019/0207737 A1 | 7/2019 | Babaei et al. |
| 2019/0215869 A1* | 7/2019 | Lin ........................ H04W 74/02 |
| 2020/0120581 A1* | 4/2020 | Li ........................ H04W 52/02 |
| 2020/0295913 A1* | 9/2020 | Takeda .................. H04L 5/0082 |

FOREIGN PATENT DOCUMENTS

| | | |
|---|---|---|
| KR | 20190038300 A | 4/2019 |
| WO | WO-2018121772 A1 | 7/2018 |

* cited by examiner

CONFIGURATION OF COMMON SEARCH SPACES IN A DOWNLINK BANDWIDTH PART

CROSS REFERENCE

The present Application for Patent claims the benefit of U.S. Provisional Patent Application No. 62/728,617 by XU et al., entitled "CONFIGURATION OF COMMON SEARCH SPACES IN A DOWNLINK BANDWIDTH PART," filed Sep. 7, 2018, assigned to the assignee hereof, and expressly incorporated herein.

BACKGROUND

The following relates generally to wireless communications, and more specifically to configuration of common search spaces in a downlink bandwidth part (BWP).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some cases, a UE may monitor different bandwidths or BWPs for downlink channel information from a base station. However, monitoring for and processing the downlink channel information in multiple bandwidths may place a high burden on the UE and waste network scheduling budget, resulting in inefficient communications between the UE and base station.

SUMMARY

The described techniques relate to improved methods, systems, devices, and apparatuses that support configuration of common search spaces in a downlink bandwidth part (BWP). Generally, the described techniques provide for enabling a user equipment (UE) to determine which one or more common search spaces to monitor in at least an initial access bandwidth, or a downlink BWP, or both, for control information. For example, the UE may be configured to monitor an initial access bandwidth when attempting to connect to the base station. After initial access, the UE may then be configured to monitor one or more additional bandwidths or BWPs. Accordingly, the UE may monitor for the downlink channel information to identify one or more common search spaces within the initial access bandwidth and/or one or more BWPs. In some aspects, a common search space may be a search space common to multiple UEs. For example, the UEs may monitor or search the common search space for signals or signaling messages which the UEs may use for establishing dedicated channels.

In some examples, the UE may obtain access to a base station by performing an initial access procedure within a bandwidth configured for initial access (e.g., an initial access bandwidth). In some cases, the UE may receive, during the initial access procedure, a cell specific configuration of a control channel common search space within the initial access bandwidth. For example, the UE may receive a master information block (MIB) that includes a configuration for a first system information block (SIB1). The SIB1 may indicate a cell specific configuration for a control channel common search space (e.g., physical downlink control channel (PDCCH) common search space) within the initial access bandwidth within which the UE may monitor for control information (e.g., information about a downlink channel).

In some aspects, during the initial access procedure, the UE may monitor a default bandwidth for a MIB, where the default bandwidth may be referred to as the initial access bandwidth. In some aspects, the initial access bandwidth may include a bandwidth known to the UE and the base station for communications between the UE and the base station (e.g., the UE and the base station may be preconfigured with the initial access bandwidth). The UE may be configured to search the initial access bandwidth for communications from the base station. For example, the initial access bandwidth may be bandwidth within which the base station is known to transmit information associated with a common search space (e.g., MIB, SIB1). Accordingly, the cell specific configuration may indicate a configuration for one or more first control channel common search spaces within the initial access bandwidth that the UE may monitor for control information, such as scheduling information and associated information.

Additionally, the UE may receive dedicated signaling (e.g., higher layer signaling or dedicated radio resource control (RRC) signaling) after the initial access procedure that indicates a downlink BWP and may provide a cell specific configuration for a control channel common search space (e.g., PDCCH common search space) within the configured downlink BWP in which the UE may monitor to receive control information. The dedicated signaling may also indicate whether the first control channel common search space(s) within the initial access bandwidth remain accessible and may be utilized for receiving control information in the initial access bandwidth after completion of an initial access procedure. Accordingly, the UE may monitor at least one of the first control channel common search space(s), or the second control channel common search space(s) based on dedicated signaling, or both, for control information. In some aspects, the dedicated signaling may be signaling that is directed to a specific UE, and may be differentiated from common or group signaling (e.g., signaling commonly broadcast or associated with a set of UEs). For example, the base station may transmit dedicated signaling which is directed to a specific one or more UEs in a wireless communication system, while not directed to one or more other UEs.

In some examples, the initial access bandwidth and one or more downlink BWPs may have SCS, and both bandwidths may occupy at least the same frequencies (e.g., the downlink BWP may fully contain the initial access bandwidth). Based on the same SCS and same occupied frequencies, the UE may monitor common search spaces for and process control information received at least in the initial access bandwidth, or the downlink BWP, or both. For example, if a UE is configured to process one or more common search spaces in the initial access bandwidth (e.g., search space is always accessible after a DL BWP is configured for the UE), the UE may monitor one or more control channel common search space(s) in the initial access bandwidth, one or more control channel search spaces in the configured downlink BWP, or any combination thereof.

In some examples, when the initial access bandwidth and the downlink BWP have the same SCS, the UE may determine to process common control channel search spaces in one of or either the initial access bandwidth or the downlink BWP based on dedicated signaling received from the network (e.g., from the base station). For example, the UE may determine which one or more common control channel search spaces to process in a corresponding bandwidth based on network signaling. For example, the network may use dedicated signaling to configure the UE with which one or more common control channel search spaces to monitor at least in the initial access bandwidth, or the downlink bandwidth part, or both.

Additionally or alternatively, the network may indicate in cell specific configuration (e.g., a SIB1) that the UE is to monitor the first control channel common search space(s) in the initial access bandwidth, and the network may skip providing in dedicated signaling a cell specific configuration for a control channel common search space within the downlink BWP. In other cases, the network does not indicate in cell specific configuration (e.g., a SIB1) that the UE is to process a control channel common search space in the initial access bandwidth after initial access and provides dedicated signaling in the configured downlink BWP that indicates a cell specific configuration for one or more second control channel common search space(s) that the UE is to process in a downlink BWP configured during initial access.

In some cases, the initial access bandwidth and the downlink BWP may have different SCSs, occupy different frequencies (e.g., downlink BWP does not fully contain the initial access bandwidth), or a combination thereof. Accordingly, when the initial access bandwidth is not fully overlapped by the downlink BWP based on the different SCS and/or different occupied frequencies, dedicated signaling may configure the UE to monitor the second control channel common search space(s) within the downlink BWP.

A method of wireless communication by a UE is described. The method may include performing an initial access procedure within an initial access bandwidth to obtain access to a cell, receiving, during the initial access procedure, a first cell specific configuration of a first control channel common search space within the initial access bandwidth and an indication of a downlink BWP, receiving dedicated signaling associated with (e.g., within) the downlink BWP, and monitoring at least one of the first control channel common search space, or a second control channel common search space within the downlink BWP based on the dedicated signaling, or both, for control information.

An apparatus for wireless communication by a UE is described. The apparatus may include a processor, memory in electronic communication with the processor, and instructions stored in the memory. The instructions may be executable by the processor to cause the apparatus to perform an initial access procedure within an initial access bandwidth to obtain access to a cell, receive, during the initial access procedure, a first cell specific configuration of a first control channel common search space within the initial access bandwidth and an indication of a downlink BWP, receive dedicated signaling associated with (e.g., within) the downlink BWP, and monitor at least one of the first control channel common search space, or a second control channel common search space within the downlink BWP based on the dedicated signaling, or both, for control information.

Another apparatus for wireless communication by a UE is described. The apparatus may include means for performing an initial access procedure within an initial access bandwidth to obtain access to a cell, receiving, during the initial access procedure, a first cell specific configuration of a first control channel common search space within the initial access bandwidth and an indication of a downlink BWP, receiving dedicated signaling associated with (e.g., within) the downlink BWP, and monitoring at least one of the first control channel common search space, or a second control channel common search space within the downlink BWP based on the dedicated signaling, or both, for control information.

A non-transitory computer-readable medium storing code for wireless communication by a UE is described. The code may include instructions executable by a processor to perform an initial access procedure within an initial access bandwidth to obtain access to a cell, receive, during the initial access procedure, a first cell specific configuration of a first control channel common search space within the initial access bandwidth and an indication of a downlink BWP, receive dedicated signaling associated with (e.g., within) the downlink BWP, and monitor at least one of the first control channel common search space, or a second control channel common search space within the downlink BWP based on the dedicated signaling, or both, for control information.

In some examples of the method, apparatuses, and non-transitory computer-readable medium described herein, the initial access bandwidth may be included within a bandwidth of the downlink BWP and each may have a same SCS.

In some examples of the method, apparatuses, and non-transitory computer-readable medium described herein, the monitoring further may include operations, features, means, or instructions for determining that the UE may be configured to process at least one of the first control channel common search space, or the second control channel common search space, or both based on the first cell specific configuration and the dedicated signaling.

In some examples of the method, apparatuses, and non-transitory computer-readable medium described herein, the first cell specific configuration indicates that the first control channel common search space may be accessible after the initial access procedure and the dedicated signaling provides a second cell specific configuration of the second control channel common search space within the downlink BWP.

In some examples of the method, apparatuses, and non-transitory computer-readable medium described herein, the dedicated signaling indicates whether the first control channel common search space may be accessible after the initial access procedure.

In some examples of the method, apparatuses, and non-transitory computer-readable medium described herein, the dedicated signaling indicates that the first control channel common search space may be accessible after the initial access procedure and provides a second cell specific configuration of the second control channel common search space within the downlink BWP.

In some examples of the method, apparatuses, and non-transitory computer-readable medium described herein, the monitoring further may include operations, features, means, or instructions for determining that the UE may be to process only one of the first control channel common search space or the second control channel common search space based on the dedicated signaling.

In some examples of the method, apparatuses, and non-transitory computer-readable medium described herein, the determining further may include operations, features, means, or instructions for determining to process the first control channel common search space based on the dedicated signaling indicating that the first control channel common search space may be accessible after the initial access procedure and determining that the dedicated signaling does not include a second cell specific configuration of the second control channel common search space within the downlink BWP.

In some examples of the method, apparatuses, and non-transitory computer-readable medium described herein, the determining further may include operations, features, means, or instructions for determining that the UE may be to process the second control channel common search space based on the dedicated signaling including a second cell specific configuration of the second control channel common search space within the downlink BWP.

In some examples of the method, apparatuses, and non-transitory computer-readable medium described herein, the determining further may include operations, features, means, or instructions for determining to process the first control channel common search space based on determining that the dedicated signaling does not include a second cell specific configuration of the second control channel common search space within the downlink BWP.

In some examples of the method, apparatuses, and non-transitory computer-readable medium described herein, the determining further may include operations, features, means, or instructions for determining to process the second control channel common search space based on determining that the dedicated signaling includes a second cell specific configuration of the second control channel common search space within the downlink BWP.

In some examples of the method, apparatuses, and non-transitory computer-readable medium described herein, the dedicated signaling indicates whether the first control channel common search space may be accessible after the initial access procedure.

In some examples of the method, apparatuses, and non-transitory computer-readable medium described herein, the determining further may include operations, features, means, or instructions for determining to process the second control channel common search space based on determining that the dedicated signaling includes a second cell specific configuration of the second control channel common search space within the downlink BWP.

In some examples of the method, apparatuses, and non-transitory computer-readable medium described herein, the determining further may include operations, features, means, or instructions for determining to process the first control channel common search space based on the dedicated signaling indicating that the first control channel common search space may be accessible after the initial access procedure and determining that the dedicated signaling does not include a second cell specific configuration of the second control channel common search space within the downlink BWP.

In some examples of the method, apparatuses, and non-transitory computer-readable medium described herein, the determining further may include operations, features, means, or instructions for determining that the UE may be to process the second control channel common search space based on the dedicated signaling including a second cell specific configuration of the second control channel common search space within the downlink BWP.

In some examples of the method, apparatuses, and non-transitory computer-readable medium described herein, the monitoring further may include operations, features, means, or instructions for determining that the UE may be to process only one of the first control channel common search space or the second control channel common search space based on the dedicated signaling.

In some examples of the method, apparatuses, and non-transitory computer-readable medium described herein, the monitoring further may include operations, features, means, or instructions for determining that the UE may be to process the second control channel common search space based on a SCS of the initial access bandwidth differing from a SCS of the downlink BWP.

In some examples of the method, apparatuses, and non-transitory computer-readable medium described herein, the monitoring further may include operations, features, means, or instructions for determining that the UE may be to process the second control channel common search space based on the initial access bandwidth not being entirely included within a bandwidth of the downlink BWP.

In some examples of the method, apparatuses, and non-transitory computer-readable medium described herein, the control information schedules a system information block, other system information, paging, random access of a physical downlink shared channel, or any combination thereof.

In some examples of the method, apparatuses, and non-transitory computer-readable medium described herein, the dedicated signaling may be RRC signaling.

In some examples of the method, apparatuses, and non-transitory computer-readable medium described herein, the first cell specific configuration indicates at least one additional control channel common search space within the initial access bandwidth.

In some examples of the method, apparatuses, and non-transitory computer-readable medium described herein, the monitoring further may include operations, features, means, or instructions for monitoring the first control channel common search space, a second control channel common search space within the downlink BWP, at least one additional control channel common search space within the initial access bandwidth, at least one additional control channel common search space within the downlink BWP, or any combination thereof, for control information based on the dedicated signaling.

A method of wireless communication by a base station is described. The method may include performing an initial access procedure within an initial access bandwidth to provide a UE access to a cell of the base station, transmitting, during the initial access procedure, a first cell specific configuration of a first control channel common search space within the initial access bandwidth and an indication of a downlink BWP, transmitting dedicated signaling associated with (e.g., within) the downlink BWP, and transmitting control information within at least one of the first control channel common search space, or a second control channel common search space within the downlink BWP, or both, based on the dedicated signaling (e.g., according to the dedicated signaling).

An apparatus for wireless communication by a base station is described. The apparatus may include a processor, memory in electronic communication with the processor, and instructions stored in the memory. The instructions may be executable by the processor to cause the apparatus to perform an initial access procedure within an initial access bandwidth to provide a UE access to a cell of the base station, transmit, during the initial access procedure, a first cell specific configuration of a first control channel common search space within the initial access bandwidth and an indication of a downlink BWP, transmit dedicated signaling associated with (e.g., within) the downlink BWP, and transmit control information within at least one of the first control channel common search space, or a second control channel common search space within the downlink BWP, or both, based on the dedicated signaling (e.g., according to the dedicated signaling).

Another apparatus for wireless communication by a base station is described. The apparatus may include means for performing an initial access procedure within an initial access bandwidth to provide a UE access to a cell of the base station, transmitting, during the initial access procedure, a first cell specific configuration of a first control channel common search space within the initial access bandwidth and an indication of a downlink BWP, transmitting dedicated signaling associated with (e.g., within) the downlink BWP, and transmitting control information within at least one of the first control channel common search space, or a second control channel common search space within the downlink BWP, or both, based on the dedicated signaling (e.g., according to the dedicated signaling).

A non-transitory computer-readable medium storing code for wireless communication by a base station is described. The code may include instructions executable by a processor to perform an initial access procedure within an initial access bandwidth to provide a UE access to a cell of the base station, transmit, during the initial access procedure, a first cell specific configuration of a first control channel common search space within the initial access bandwidth and an indication of a downlink BWP, transmit dedicated signaling associated with (e.g., within) the downlink BWP, and transmit control information within at least one of the first control channel common search space, or a second control channel common search space within the downlink BWP, or both, based on the dedicated signaling (e.g., according to the dedicated signaling).

In some examples of the method, apparatuses, and non-transitory computer-readable medium described herein, the initial access bandwidth may be included within a bandwidth of the downlink BWP and each may have a same SCS.

Some examples of the method, apparatuses, and non-transitory computer-readable medium described herein may further include operations, features, means, or instructions for transmitting a first cell specific configuration indicating that the first control channel common search space may be accessible after the initial access procedure, where the dedicated signaling provides a second cell specific configuration of the second control channel common search space within the downlink BWP.

In some examples of the method, apparatuses, and non-transitory computer-readable medium described herein, the dedicated signaling indicates whether the first control channel common search space may be accessible after the initial access procedure.

In some examples of the method, apparatuses, and non-transitory computer-readable medium described herein, the dedicated signaling indicates that the first control channel common search space may be accessible after the initial access procedure and provides a second cell specific configuration of the second control channel common search space within the downlink BWP.

In some examples of the method, apparatuses, and non-transitory computer-readable medium described herein, the dedicated signaling indicates that the first control channel common search space may be accessible after the initial access procedure and does not include a second cell specific configuration of the second control channel common search space within the downlink BWP.

In some examples of the method, apparatuses, and non-transitory computer-readable medium described herein, the dedicated signaling includes a second cell specific configuration of the second control channel common search space within the downlink BWP.

In some examples of the method, apparatuses, and non-transitory computer-readable medium described herein, the dedicated signaling does not include a second cell specific configuration of the second control channel common search space within the downlink BWP.

In some examples of the method, apparatuses, and non-transitory computer-readable medium described herein, the dedicated signaling includes a second cell specific configuration of the second control channel common search space within the downlink BWP.

In some examples of the method, apparatuses, and non-transitory computer-readable medium described herein, the dedicated signaling indicates whether the first control channel common search space may be accessible after the initial access procedure.

In some examples of the method, apparatuses, and non-transitory computer-readable medium described herein, the dedicated signaling includes a second cell specific configuration of the second control channel common search space within the downlink BWP.

In some examples of the method, apparatuses, and non-transitory computer-readable medium described herein, the dedicated signaling indicates that the first control channel common search space may be accessible after the initial access procedure and does not include a second cell specific configuration of the second control channel common search space within the downlink BWP.

In some examples of the method, apparatuses, and non-transitory computer-readable medium described herein, the dedicated signaling includes a second cell specific configuration of the second control channel common search space within the downlink BWP.

In some examples of the method, apparatuses, and non-transitory computer-readable medium described herein, a SCS of the initial access bandwidth differs from a SCS of the downlink BWP.

In some examples of the method, apparatuses, and non-transitory computer-readable medium described herein, the initial access bandwidth may be not entirely included within a bandwidth of the downlink BWP.

In some examples of the method, apparatuses, and non-transitory computer-readable medium described herein, the control information schedules a system information block, other system information, paging, random access of a physical downlink shared channel, or any combination thereof.

In some examples of the method, apparatuses, and non-transitory computer-readable medium described herein, the dedicated signaling may be RRC signaling.

DETAILED DESCRIPTION

Figure 1:
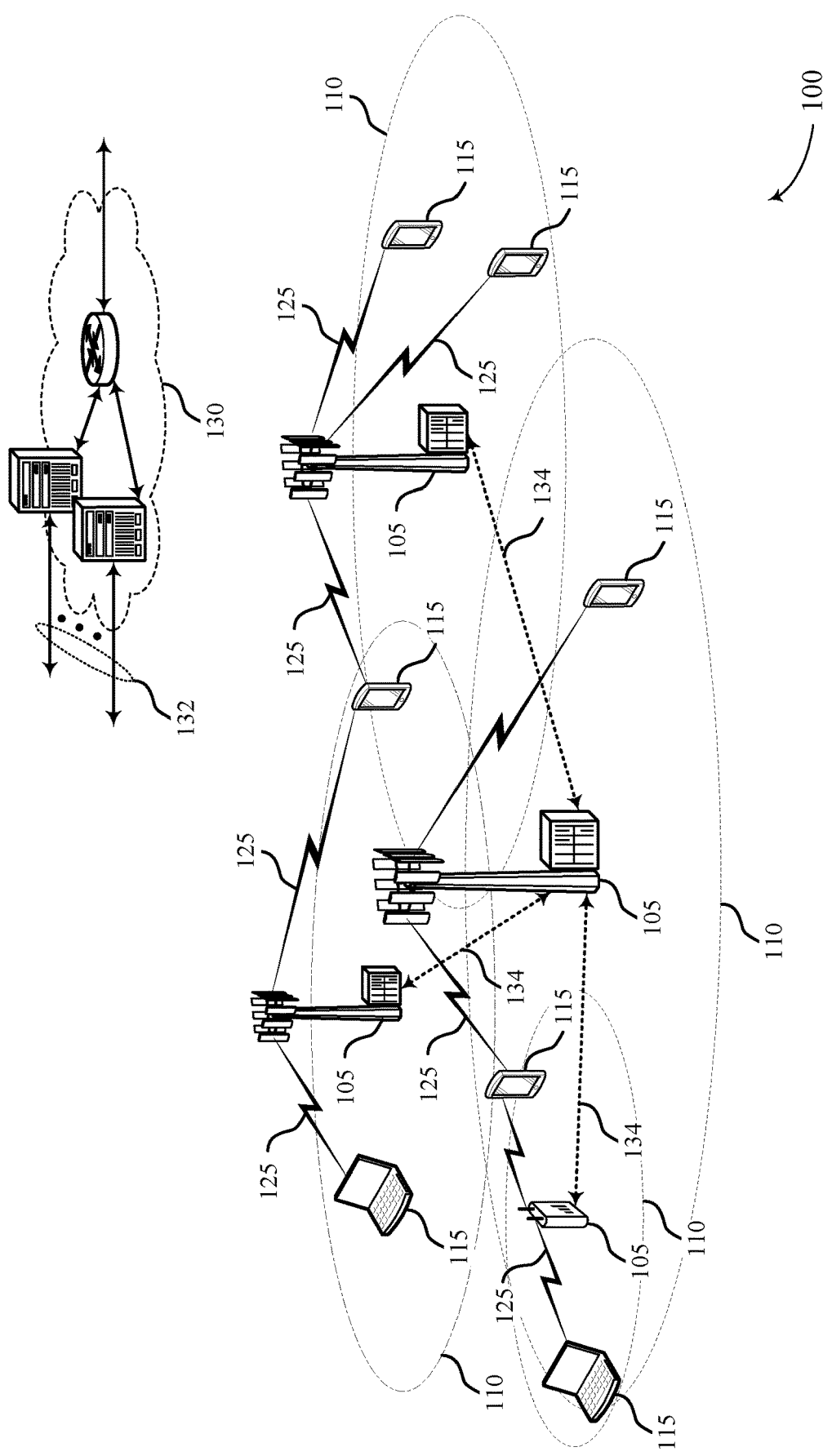
FIG. 1 illustrates an example of a system for wireless communications that supports configuration of common search spaces in a downlink bandwidth part in accordance with aspects of the present disclosure.

A user equipment (UE) may obtain access to a base station by performing an initial access procedure within an initial access bandwidth (e.g., a bandwidth configured for initial access). In some cases, the UE may receive, during the initial access procedure, a cell specific configuration of a control channel common search space within the initial access bandwidth. In an example, the UE may receive a master information block (MIB) with a configuration for a first system information block (SIB1) that indicates a cell specific configuration of one or more control channel common search spaces that the UE may then monitor for control information (e.g., information about a downlink channel for subsequent communications) transmitted by a base station. The SIB1 may include a cell specific configuration for one or more first control channel common search spaces for a physical downlink control channel (PDCCH) within the initial access bandwidth that the UE may monitor for corresponding control information, such as scheduling information and associated information (e.g., SIB1, other system information (OSI), paging information, and random access messages). In some cases, the cell specific configuration may be referred to as a PDCCH-ConfigCommon message.

Additionally, the UE may receive dedicated signaling (e.g., higher layer signaling or dedicated radio resource control (RRC) signaling) after the initial access procedure that indicates a downlink bandwidth part (BWP) indicating a cell specific configuration of one or more second control channel common search spaces within a downlink BWP for the UE to monitor for control information. In some examples, the dedicated signaling may also indicate whether the first control channel common search space(s) within the initial access bandwidth remain accessible and may be utilized for receiving control information in the initial access bandwidth. Accordingly, the UE may monitor at least one of the first control channel common search space(s), or the second control channel common search space(s) based on the dedicated signaling, or both, for control information.

In some examples, the initial access bandwidth and the downlink BWPs may have a same subcarrier spacing (SCS), and both bandwidths may occupy at least the same frequencies (e.g., the downlink BWP may fully contain the initial access bandwidth). Based on the same SCS and same occupied frequencies, the UE may determine to monitor one or more search spaces, and process corresponding control information, received at least in the initial access bandwidth, or the downlink BWP, or both. For example, if the cell specific configuration (e.g., SIB1) indicates that the common control channel search space remains accessible (e.g., at least partially available, always available or otherwise accessible after a DL BWP is configured for the UE) to the UE in the initial access bandwidth after completion of an initial access procedure, the UE may monitor the first control channel common search space(s) for the control information after completion of the initial access procedure. Additionally or alternatively, dedicated signaling in the downlink BWP may indicate whether the UE may monitor the second control channel common search space(s) within the configured downlink BWP and process the control information received therein instead of or in addition to monitoring the first control channel common search space(s).

In some examples, when the initial access bandwidth and the downlink BWP have the same SCS, the UE may determine to process control information in one or both of the initial access bandwidth and the downlink BWP based on network signaling provided by the base station. For example, the UE may determine which control information to process in a corresponding bandwidth when the control information is available for the UE in the initial access bandwidth based on network signaling (e.g., not always available as discussed previously). For example, the network may not create or signal a monitoring configuration for the UE, and, as such, the UE may monitor and process the control information from the second control channel common search space(s) of the downlink BWP based on dedicated signaling.

In some cases, the initial access bandwidth and the downlink BWP may have different SCSs, occupy different frequencies (e.g., downlink BWP does not fully contain the initial access bandwidth), or a combination thereof. Accordingly, when the initial access bandwidth is not fully overlapped by the downlink BWP based on the different SCS and/or different occupied frequencies, the UE may monitor the second control channel common search space(s) in the downlink BWP for and process control information received therein. Additionally or alternatively, in other cases, the UE may process a cell specific configuration for one or more common search spaces in at least the initial access bandwidth, or the downlink BWP, or both, and determine whether to process search spaces in one or both bandwidths based on the dedicated signaling (e.g., the UE is configured to monitor common search spaces and process the control information received therein in both bandwidths).

Particular aspects of the subject matter described herein may be implemented to realize one or more advantages. The described methods, systems, devices, and apparatuses provide techniques which may support configuration of common search spaces in a BWP. As such, supported techniques may include features for a UE to efficiently monitor and process common search spaces, which may reduce processing burden on the UE. Additionally, the improved techniques provide for efficient network scheduling between a UE and a base station, which may improve the UE's ability to conserve power.

Aspects of the disclosure are initially described in the context of a wireless communications system. An additional wireless communications system, examples of bandwidth monitoring configurations, and a process flow are then provided to illustrate additional aspects of the disclosure. Aspects of the disclosure are further illustrated by and described with reference to apparatus diagrams, system diagrams, and flowcharts that relate to configuration of common search spaces in a downlink BWP.

FIG. 1 illustrates an example of a wireless communications system 100 that supports configuration of common search spaces in a downlink BWP in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations (e.g., a base station which may relay data between macro eNBs, small cell eNBs, gNBs, wireless clients, or other base stations to either a main base station or another relay base station), and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, in some examples, in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas.

Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the SCS or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and SCS are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and SCS may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

When first attempting to connect to a base station 105, a UE 115 may monitor a default initial access bandwidth defined by an MIB received from the base station 105. In some cases, the initial access bandwidth may be referred to as an initial downlink BWP, a bandwidth of a first control resource set (CORESET) (e.g., CORESET #0), or a BWP configured by MIB. The UE 115 may receive the MIB via higher layer signaling (e.g., RRC signaling) from base station 105. Additionally, the MIB may indicate an SIB1 within the initial access bandwidth, and the SIB1 may provide a cell specific configuration of a control channel common search space (e.g., PDCCH common search space) within the initial access bandwidth for the UE 115 to monitor for control information. The cell specific configuration for a control channel common search space may be referred to as a PDCCH-ConfigCommon message. The PDCCH common search spaces may include control information to schedule the SIB1, OSI, paging information, random access related physical downlink shared channels (PDSCHs), or the like.

A BWP may be a bandwidth via which the UE 115 can transmit and receive information, where the bandwidth for the BWP may be a subset of a total available bandwidth for communications between the UE 115 and the base station 105. In some examples, four (4) BWPs may be configured for a UE 115 (e.g., a defined or maximum number of BWPs may be configured), and the UE 115 may monitor (e.g., be required to monitor) a single active BWP at a time. As described herein, during initial access, the UE 115 may monitor a default bandwidth for a MIB, where the default bandwidth may be referred to as the initial access bandwidth. The MIB may be carried by a physical broadcast channel (PBCH), where the PBCH is transmitted together with synchronization signals in a synchronization signal block (SSB) (e.g., a synchronization/PBCH block).

The UE 115 may be considered to be in an initial access prior to sending signaling or data specific to the UE 115, for example, while setting up communication between the UE 115 and a base station 105. For example, after powering on, or after entering into an awake state following a sleep state, the UE 115 may be considered to be in an initial access during periods of cell search and cell selection, periods of receiving system information (e.g., MIB, SIB1), or periods of random access procedure. For example, the UE 115 may be considered to be in an initial access before message four (4) of a random access procedure is received (e.g., msg4). The initial access procedure may include acquiring an SSB for time and frequency synchronization, reading the MIB which includes a PDCCH configuration for the SIB1, monitoring the PDCCH indicated by the SIB1, decoding the SIB1 accordingly, decoding OSI, and starting the random access procedure until msg4 is received. In some examples, the UE 115 may receive higher layer or RRC signaling after completion of the initial access procedure.

Different search spaces may be configured for different types of control information (e.g., SIB1, OSI, random access, paging information, etc.). Additionally, common search spaces may be specific to a cell, where multiple UEs 115 may monitor the same common search spaces for control information. The control information may be used for connecting to the cell (e.g., base station 105), scheduling subsequent downlink transmissions, performing random access procedures, reconnecting to a cell, etc.

Cell specific configuration of PDCCH common search spaces may also be provided by the base station 105 to the UE 115 via dedicated signaling, such as by higher layer or RRC signaling after completion of an initial access procedure. In general, the cell specific configuration for a common control channel search space in the downlink BWP may be different than the cell specific configuration for a common control channel search space provided in the SIB 1. For example, common search spaces configured in the initial access bandwidth may occupy different control resources (i.e., time and frequency resources assigned to PDCCHs) than the common search spaces configured in the downlink BWP. However, problems may arise for the UE 115 to monitor for broadcast information (e.g., the control information) after the initial access when multiple bandwidths or BWPs are configured for the UE 115.

In conventional systems, the UE 115 may initially monitor control channel common search space within the initial access bandwidth for control information. The downlink BWP may then be configured and activated after the initial access through the dedicated signaling, where the UE 115 may then only monitor control channel common search space(s) within the downlink BWP for the control information. However, the control information may still be available to the UE in search spaces within the initial access bandwidth as well as the downlink BWP after the initial access.

Wireless communications system 100 may support efficient techniques for determining which common search spaces to monitor and process. For example, a UE 115 may perform an initial access procedure within an initial access bandwidth. In some cases, the UE may receive, during the initial access procedure, a cell specific configuration of a control channel common search space within the initial access bandwidth. In an example, the UE may receive a cell specific configuration that indicates a control channel common search space within the initial access bandwidth, which the UE may monitor for control information (e.g., information about a downlink channel). Additionally, the UE may receive dedicated signaling after the initial access procedure that may indicate one or more second control channel common search spaces within the downlink BWP that the UE may monitor for control information. The dedicated signaling may also indicate whether the first control channel common search space(s) remains accessible and may be utilized for receiving control information in the initial access bandwidth. Accordingly, the UE may monitor at least one of the first control channel common search space(s), or the second control channel common search space(s), or both for control information based on the dedicated signaling.

Figure 2:
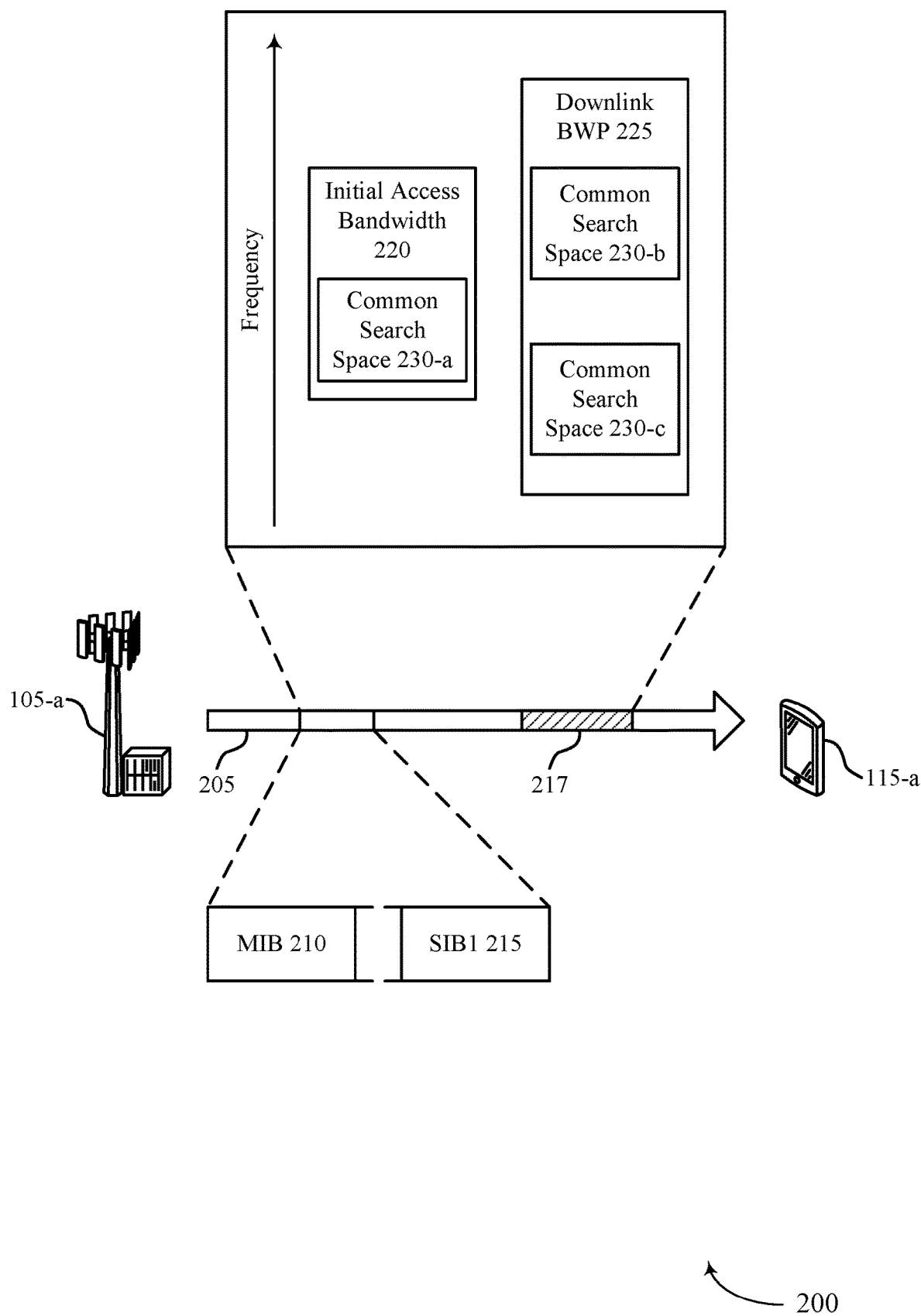
FIG. 2 illustrates an example of a wireless communications system that supports a configuration of common search spaces in different downlink bandwidths in accordance with aspects of the present disclosure.

FIG. 2 illustrates an example of a wireless communications system 200 that supports a configuration of common search spaces in different downlink bandwidths in accordance with aspects of the present disclosure. In some examples, wireless communications system 200 may implement aspects of wireless communications system 100. Wireless communications system 200 may include a base station 105-a and a UE 115-a, which may be examples of base stations 105 and UEs 115, respectively, as described herein with reference to FIG. 1.

Base station 105-a may transmit downlink information to UE 115-a on resources of a carrier 205. When performing an initial access procedure, the UE 115-a may receive a cell specific configuration of a control channel common search space within an initial access bandwidth 220. In an example, UE 115-a may receive an MIB 210 that configures an SIB1 215 that indicates a cell specific configuration for a control channel common search space within the initial access bandwidth 220 for receiving control information from base station 105-a. The cell specific configuration may carry configurations for common search spaces for PDCCHs that schedule control information such as SIB1, OSI, paging information, and random access related PDSCHs. The cell specific configuration may be referred to as a PDCCH-ConfigCommon message. As such, the cell specific configuration may indicate a common search space 230-a within initial access bandwidth 220 that UE 115-a may monitor for control information.

Additionally, after the initial access, base station 105-a may transmit dedicated signaling 217 to indicate a downlink BWP 225 and a cell specific configuration of one or more control channel common search spaces within downlink BWP 225 transporting control information. The dedicated signaling may be transmitted via RRC signaling or other higher layer signaling. In some cases, the cell specific configuration included within the dedicated signaling may indicate one or more common search spaces 230-b and 230-c within downlink BWP 225 for receiving control information such as scheduling information, SIB1, OSI, paging information, random access related PDSCHs, or the like. While one common search space 230 is shown in initial access bandwidth 220 and two common search spaces 230 are shown in downlink BWP 225, it is to be understood that greater or fewer common search spaces may be configured in either the initial access bandwidth 220, the downlink BWP 225, or both.

The relationship between initial access bandwidth 220 and downlink BWP 225 may be represented by different scenarios, where UE 115-a processes the cell specific configuration and corresponding common search spaces 230 within one or both of the different bandwidths based on the different scenarios. In a first scenario, downlink BWP 225 may fully contain initial access bandwidth 220 (e.g., overlap), and both bandwidths may have the same SCS (e.g., 15 kHz). Additionally or alternatively, in a second scenario, downlink BWP 225 may fully contain initial access bandwidth 220 (e.g., overlap), but both bandwidths may have different SCSs (e.g., initial access bandwidth 220 may have an SCS of 15 kHz and downlink BWP 225 may have an SCS different than 15 kHz). In a third scenario, downlink BWP 225 may not fully contain initial access bandwidth 220 (e.g., no overlap). Whether control information is available for UE 115-a to process in either initial access bandwidth 220, downlink BWP 225, or both may differ based on the scenario.

As discussed above, UE 115-a may process, during an initial access procedure, a cell specific configuration indicated in a SIB1 to identify a common search space 230-a and monitor the common search space 230-a for control information. Downlink BWP 225 may then be configured and activated after the initial access through dedicated signaling received from base station 105-a. The dedicated signaling may include a cell specific configuration for common search spaces 230-b and 230-c within the downlink BWP 225 that the UE may monitor for control information. However, control information may still be available in initial access bandwidth 220 as well as downlink BWP 225 after completion of the initial access.

When initial access bandwidth 220 and downlink BWP 225 have the same SCS and overlap (e.g., scenario 1), there may be up to two sets of common search spaces 230 configured by up to two sets of cell specific configurations for the two bandwidths for UE 115-a to process (e.g., at least one of a first common search space 230 configured by a first cell specific configuration, or a second commons search space 230 configured by a second cell specific configuration, or both). For example, a cell specific configuration indicated by SIB1 215 that is configured by MIB 210 may indicate that common search space 230-a in initial access bandwidth 220 may be accessible (e.g., is always accessible even after completion of initial access) by UE 115-a, and the cell specific configuration indicated in dedicated signaling in downlink BWP 225 may indicate that common search spaces 230-b and 230-c within the downlink BWP 225 are available for UE 115-a to process. In some examples, the control information in initial access bandwidth 220 and the downlink BWP 225 may be copies of the same control information transported in different resources of corresponding common search spaces 230 within their respective bandwidths.

Additionally or alternatively, UE 115-a may process one or two of the SIB1-based or the dedicated-signaling based cell specific configurations based on whether the cell specific configuration provided by SIB1 215 is accessible by UE 115-a based on network signaling (e.g., from base station 105-a).

In a first configuration option (e.g., configuration option 1), if base station 105-a (e.g., network) instructs UE 115-a to process the cell specific configuration (e.g., PDCCH-ConfigCommon) for common search space 230-a provided by SIB1 215 in initial access bandwidth 220 and if the cell specific configuration for common search space 230-b and/or 230-c is configured by the dedicated signaling in downlink BWP 225, two sets of cell specific configuration information and corresponding common search spaces 230 may be available to UE 115-a. Thus, the UE 115-a may monitor one or more common search spaces 230 in the initial access bandwidth 220 for control information, and/or may monitor one or more common search spaces 230 in the downlink BWP 225 for control information.

In a second configuration option (e.g., configuration option 2), if base station 105-a instructs UE 115-a to process the cell specific configuration for common search space 230-a provided by SIB1 215 in initial access bandwidth 220 and if the cell specific configuration for common search space 230-b and/or 230-c is not configured by the dedicated signaling in downlink BWP 225, only one cell specific configuration (i.e., provided by the SIB1 215 that was configured by MIB 210) and the corresponding common search spaces 230 may be available to UE 115-a (e.g., within initial access bandwidth 220). Thus, the UE 115-a may monitor one or more common search spaces 230 in the initial access bandwidth 220 for control information, but may not monitor one or more common search spaces 230 in the downlink BWP 225 for control information.

In a third configuration option (e.g., configuration option 3), if base station 105-a does not instruct UE 115-a to process the cell specific configuration for common search space 230-a provided by SIB1 215 in initial access bandwidth 220 and if the cell specific configuration for common search space 230-b and/or 230-c is configured by the dedicated signaling in downlink BWP 225, only one cell specific configuration (i.e., configured by the dedicated signaling for common search space 230-b and/or 230-c) and the corresponding common search spaces 230 may be available to UE 115-a (e.g., in downlink BWP 225). Thus, the UE 115-a may not monitor one or more common search spaces 230 in the initial access bandwidth 220 for control information, and may monitor one or more common search spaces 230 in the downlink BWP 225 for control information.

When initial access bandwidth 220 and downlink BWP 225 do not have the same SCS and/or do not overlap (e.g., scenario 2 and 3), the cell specific configuration for common search space 230-a configured in initial access bandwidth 220 may not be accessible to UE 115-a after completion of the initial access procedure due to the different SCS and/or different frequency bandwidths. Accordingly, after cell specific common search spaces 230-b and/or 230-c are configured by the dedicated signaling in downlink BWP 225 (e.g., through the corresponding control information), there may be at most one copy of the control information to be processed by UE 115-a (e.g., in downlink BWP 225). Thus, the UE 115-a may not monitor one or more common search spaces 230 in the initial access bandwidth 220 for control information, and may monitor one or more common search spaces 230 in the downlink BWP 225 for control information.

In some examples, UE 115-a may choose to process cell specific configuration(s) for one or more common search spaces in a particular bandwidth (e.g., monitor search spaces within initial access bandwidth 220 or downlink BWP 225, but not both) and monitor the one or more PDCCHs in the associated common search space(s) 230. In some cases, this preference (e.g., configuration) for processing a single cell specific configuration(s) for one or more common search spaces in a particular bandwidth may be maintained regardless of the scenarios as described herein. For example, the same types of common search spaces 230 may be configured by the cell specific configuration(s) provided by SIB1 215 in initial access bandwidth 220 and by the cell specific configuration(s) configured by the dedicated signaling in downlink BWP 225. As such, processing both cell specific configuration(s) for the initial access bandwidth and for the downlink bandwidth part may not provide any additional information to UE 115-a, but still may result in a higher burden to UE 115-a. If both sets of cell specific configuration(s) are processed by UE 115-a, PDCCHs of both cell specific configuration(s) may consume the PDCCH blind decode and control channel element (CCE) budgets for UE 115-a. Such redundant processing may waste a scheduling budget of the UE 115-a that could have been used for processing other PDCCHs (e.g., other blind decodes).

To enable the preference of processing the cell specific configuration(s) for a particular bandwidth (e.g., initial access bandwidth or downlink BWP, but not both), UE 115-a may expect to handle one or more conditions to process the cell specific configuration(s) for a particular bandwidth. For scenario 1 (e.g., bandwidths of initial access bandwidth and downlink BWP have the same SCS and overlap) and when a cell specific configuration provided by SIB1 215 in initial access bandwidth 220 is available to UE 115-a (e.g., always available or otherwise accessible after a DL BWP is configured for the UE 115-a), then UE 115-a may process the cell specific configuration to monitor one or more corresponding common search spaces 230-a in initial access bandwidth 220, provided that dedicated signaling in downlink BWP 225 does not include a cell specific configuration for search spaces within the downlink BWP 225. Additionally or alternatively, when dedicated signaling in downlink BWP 225 includes a cell specific configuration, UE 115-a may process the cell specific configuration configured by the dedicated signaling to monitor one or more common search spaces 230-b and 230-c in downlink BWP 225, and may skip monitoring the one or more corresponding common search spaces 230-a in initial access bandwidth 220.

In other cases, for scenario 1 and when the control information provided by SIB1 215 in initial access bandwidth 220 is available to UE 115-a based on network signaling, UE 115-a may expect to process a single cell specific configuration based on the configuration options as described herein. For the first configuration option, base station 105-a either may not create a first configuration option situation to UE 115-a or UE 115-a may process the cell specific configuration indicated by the dedicated signaling in downlink BWP 225.

For the second configuration option, base station 105-a may instruct UE 115-a to process a cell specific configuration provided by SIB1 215 in initial access bandwidth 220, and the dedicated signaling may not include a cell specific configuration for a common search space 230 within downlink BWP 225. Thus, the UE 115-a may monitor one or more common search spaces 230 in the initial access bandwidth 220 for control information, and may not monitor one or more common search spaces 230 in the downlink BWP 225 for control information.

For the third configuration option, base station 105-a may not instruct UE 115-a to process the cell specific configuration provided by SIB1 215 for a common search space in the initial access bandwidth, and the cell specific configuration indicated in dedicated signaling may indicate a common search space in downlink BWP 225 for UE 115-a to monitor and process for control information. Thus, the UE 115-a may not monitor one or more common search spaces 230 in the initial access bandwidth 220 for control information, and may monitor one or more common search spaces 230 in the downlink BWP 225 for control information.

For scenarios 2 and 3 (e.g., bandwidths do not have the same SCSs and/or do not overlap), UE 115-a may process the cell specific configuration received in downlink signaling indicating a common search space in downlink BWP 225 for UE 115-a to monitor and process for control information. Thus, the UE 115-a may not monitor one or more common search spaces 230 in the initial access bandwidth 220 for control information, and may monitor one or more common search spaces 230 in the downlink BWP 225 for control information.

Figure 3A:
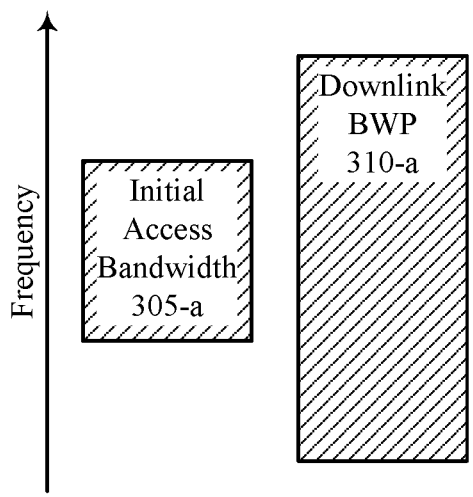
FIGS. 3A, 3B, and 3C illustrate examples of bandwidth monitoring configurations that support common search space monitoring part in accordance with aspects of the present disclosure.
Figure 3B:
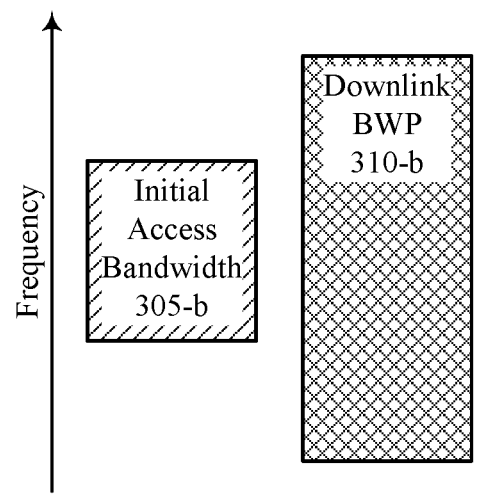
Figure 3C:
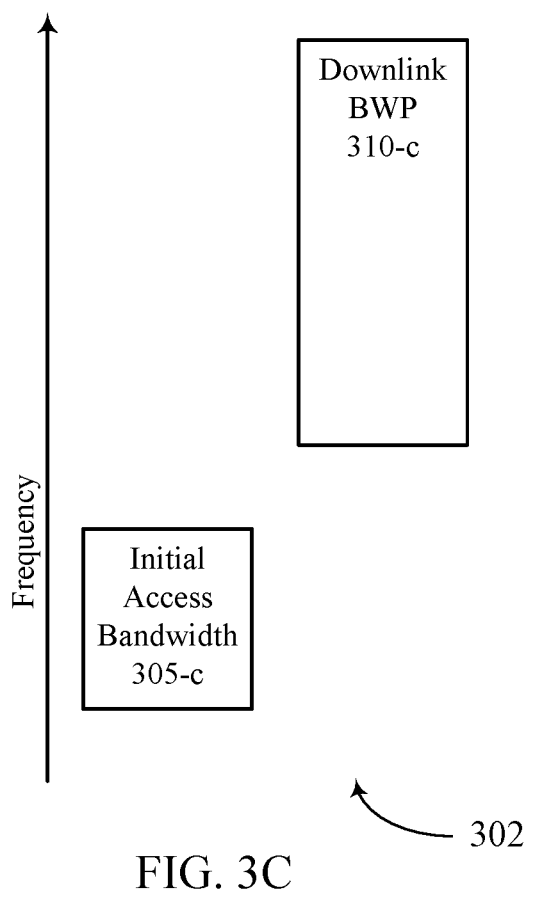

FIGS. 3A, 3B, and 3C illustrate examples of bandwidth monitoring configurations 300, 301, and 302 that support common search space monitoring in accordance with aspects of the present disclosure. In some examples, bandwidth monitoring configurations 300, 301, and 302 may implement aspects of wireless communications systems 100 and/or 200. Bandwidth monitoring configurations 300, 301, and 302 may illustrate bandwidths that a UE 115 may monitor based on configurations received from a base station 105. As described herein, the UE 115 may monitor control channel common search spaces of an initial access bandwidth 305 and/or a downlink BWP 310 for control information from the base station 105.

In bandwidth monitoring configuration 300 (e.g., the first scenario as described herein), downlink BWP 310-a may fully contain initial access bandwidth 305-a (e.g., the bandwidths overlap), and both bandwidths may have the same SCS (e.g., 15 kHz). Accordingly, the UE 115 may determine whether to monitor search spaces for control information within initial access bandwidth 305-a or downlink BWP 310-a based on whether a cell specific configuration is available (e.g., always available or otherwise accessible after a DL BWP is configured for the UE) in initial access bandwidth 305-a and whether dedicated signaling has configured a cell specific configuration for a control channel common search space in downlink BWP 310-a as described herein.

Additionally or alternatively, in bandwidth monitoring configuration 301 (e.g., the second scenario as described herein), downlink BWP 310-b may fully contain initial access bandwidth 305-b (e.g., overlap), but both bandwidths may have different SCSs (e.g., initial access bandwidth 305-b may have an SCS of 15 kHz and downlink BWP 310-b may have an SCS different than 15 kHz). Accordingly, the UE 115 may process a cell specific configuration for a control channel common search for downlink BWP 310-b indicated in dedicated signaling based on the different SCSs as described herein.

In bandwidth monitoring configuration 302, (e.g., the third scenario as described herein), downlink BWP 310-c may not fully contain initial access bandwidth 305-c (e.g., no overlap between the two bandwidths). Accordingly, the UE 115 may process cell specific configuration for a control channel common search in downlink BWP 310-c received in dedicated signaling based on the different frequencies as described herein.

Figure 4:
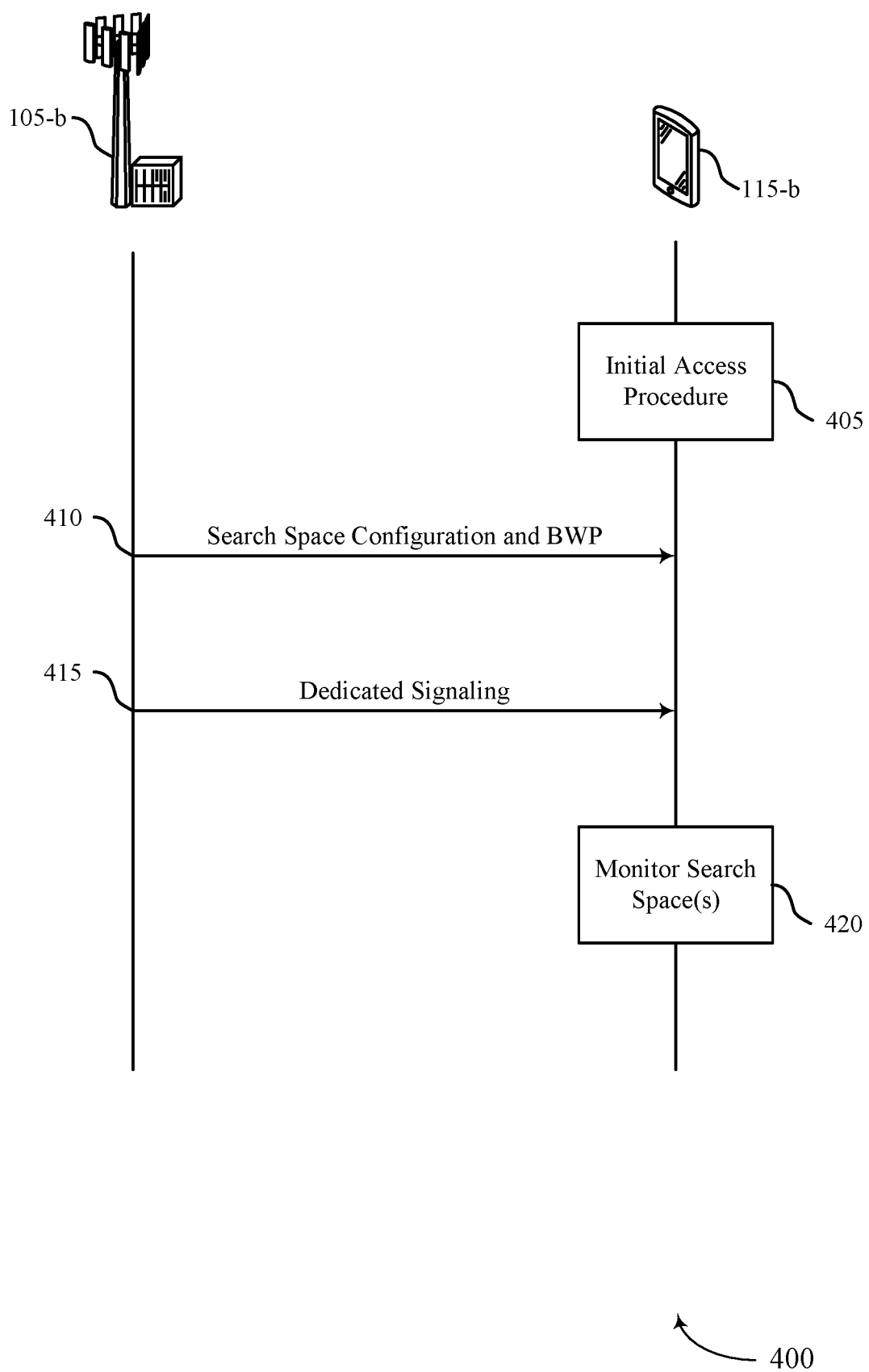
FIG. 4 illustrates an example of a process flow that supports a configuration of common search spaces in a downlink BWP in accordance with aspects of the present disclosure.

FIG. 4 illustrates an example of a process flow 400 that supports a configuration of common search spaces in a downlink BWP in accordance with aspects of the present disclosure. In some examples, process flow 400 may implement aspects of wireless communications systems 100 and/or 200. Process flow 400 may include a base station 105-b and a UE 115-b, which may be examples of corresponding base stations 105 and UEs 115, respectively, as described herein with reference to FIGS. 1-3C.

In the following description of the process flow 400, the operations between UE 115-b and base station 105-b may be performed in different orders or at different times. Certain operations may also be left out of the process flow 400, or other operations may be added to the process flow 400. It is to be understood that while UE 115-b and base station 105-b are shown performing a number of the operations of process flow 400, any wireless device may perform the operations shown.

At 405, UE 115-b may perform an initial access procedure within an initial access bandwidth to obtain access to base station 105-b (e.g., a cell operated by base station 105-b).

At 410, UE 115-b may receive, during the initial access procedure, a first cell specific configuration of a first control channel common search space within the initial access bandwidth and may receive an indication of a downlink BWP (e.g., after completion of the initial access procedure). In some cases, the first cell specific configuration indicates at least one additional control channel common search space within the initial access bandwidth.

At 415, UE 115-b may receive dedicated signaling associated with (e.g., within) the downlink BWP. In some cases, the dedicated signaling may be RRC signaling.

At 420, UE 115-b may monitor at least one of the first control channel common search space, or a second control channel common search space within the downlink BWP based on the dedicated signaling, or both, for control information. In some cases, the control information may schedule a SIB, OSI, paging, random access of a PDSCH, or any combination thereof, and the base station 105-b and the UE 115-b may communicate in accordance with the control information. Additionally, UE 115-b may monitor the first control channel common search space, a second control channel common search space within the downlink BWP, at least one additional control channel common search space within the initial access bandwidth, at least one additional control channel common search space within the downlink BWP, or any combination thereof, for control information based on the dedicated signaling.

In some cases, the initial access bandwidth may be included within a bandwidth of the downlink BWP, and the initial access bandwidth and the downlink BWP each have a same SCS. As such, UE 115-b may determine that it is configured to process at least one of the first control channel common search space within the initial access bandwidth, or the second control channel common search space within a configured downlink BWP, or both, based on the first cell specific configuration and the dedicated signaling. Additionally, the first cell specific configuration may indicate that the first control channel common search space is accessible after the initial access procedure and the dedicated signaling may provide a second cell specific configuration of the second control channel common search space within the downlink BWP. Additionally or alternatively, the dedicated signaling may indicate whether the first control channel common search space is accessible after the initial access procedure, and the dedicated signaling may also indicate that the first control channel common search space is accessible after the initial access procedure and provide a second cell specific configuration of the second control channel common search space within the downlink BWP.

In other cases, when the initial access bandwidth is included within a bandwidth of the downlink BWP and each have the same SCS, UE 115-b may determine that it is to process one of the first control channel common search space within the initial access bandwidth and the second control channel common search space within the downlink BWP based on the dedicated signaling. For example, UE 115-b may determine to process the first control channel common search space based on the dedicated signaling indicating that the first control channel common search space is accessible after the initial access procedure and may determine that the dedicated signaling does not include a second cell specific configuration of the second control channel common search space within the downlink BWP. Additionally or alternatively, UE 115-b may determine that it is to process the second control channel common search space based on the dedicated signaling including a second cell specific configuration of the second control channel common search space within the downlink BWP.

Additionally, UE 115-b may determine to process the first control channel common search space based on determining that the dedicated signaling does not include a second cell specific configuration of the second control channel common search space within the downlink BWP. Alternatively or additionally, UE 115-*b* may determine to process the second control channel common search space based on determining that the dedicated signaling includes a second cell specific configuration of the second control channel common search space within the downlink BWP.

UE 115-*b* may determine which control channel common search space to process based on the dedicated signaling indicating whether the first control channel common search space is accessible after the initial access procedure. For example, UE 115-*b* may determine to process the second control channel common search space based on determining that the dedicated signaling includes a second cell specific configuration of the second control channel common search space within the downlink BWP. Additionally or alternatively, UE 115-*b* may determine to process the first control channel common search space based on the dedicated signaling indicating that the first control channel common search space is accessible after the initial access procedure and determining that the dedicated signaling does not include a second cell specific configuration of the second control channel common search space within the downlink BWP.

In some cases, UE 115-*b* may determine that it is to process one of the first control channel common search space and the second control channel common search space based on the dedicated signaling, where the initial access bandwidth is not included within a bandwidth of the downlink BWP or each have a different SCS. Accordingly, UE 115-*b* may determine that it is to process the second control channel common search space based on a SCS of the initial access bandwidth differing from a SCS of the downlink BWP. Additionally or alternatively, UE 115-*b* may determine that it is to process the second control channel common search space based on the initial access bandwidth not being entirely included within a bandwidth of the downlink BWP.

Figure 5:
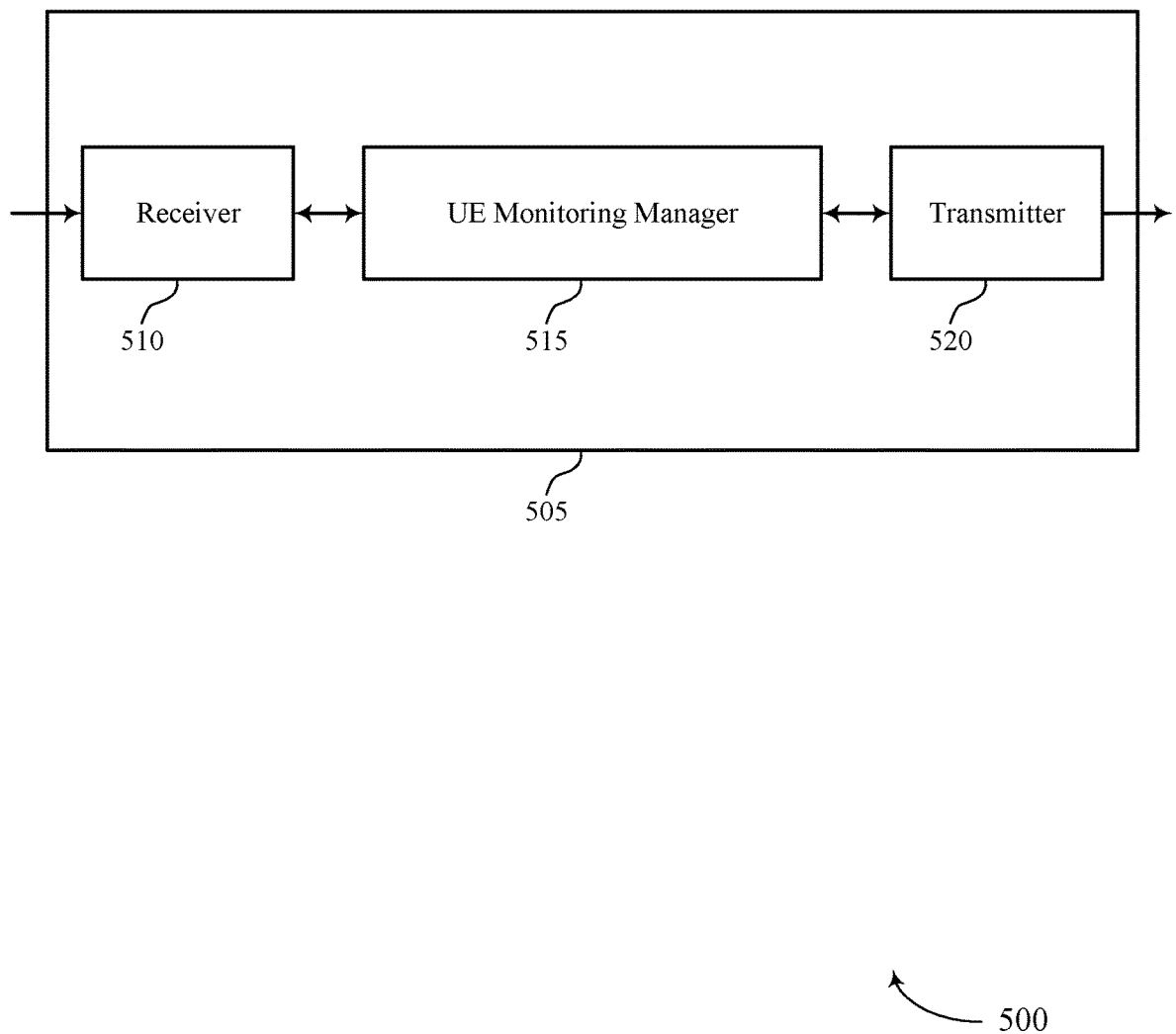
FIGS. 5 and 6 show block diagrams of devices that support configuration of common search spaces in a downlink bandwidth part in accordance with aspects of the present disclosure.

FIG. 5 shows a block diagram 500 of a device 505 that supports configuration of common search spaces in a downlink BWP in accordance with aspects of the present disclosure. The device 505 may be an example of aspects of a UE 115 as described herein. The device 505 may include a receiver 510, a UE monitoring manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to configuration of common search spaces in a downlink BWP, etc.). Information may be passed on to other components of the device 505. The receiver 510 may be an example of aspects of the transceiver 820 described with reference to FIG. 8. The receiver 510 may utilize a single antenna or a set of antennas.

The UE monitoring manager 515 may perform an initial access procedure within an initial access bandwidth to obtain access to a cell. In some cases, the UE monitoring manager 515 may receive, during the initial access procedure, a first cell specific configuration of a first control channel common search space within the initial access bandwidth and may receive an indication of a downlink BWP. Additionally, the UE monitoring manager 515 may receive dedicated signaling associated with (e.g., within) the downlink BWP. The UE monitoring manager 515 may then monitor at least one of the first control channel common search space, or a second control channel common search space within the downlink BWP based on the dedicated signaling, or both, for control information. The UE monitoring manager 515 may be an example of aspects of the UE monitoring manager 810 described herein.

The UE monitoring manager 515, or its sub-components, may be implemented in hardware, code (e.g., software or firmware) executed by a processor, or any combination thereof. If implemented in code executed by a processor, the functions of the UE monitoring manager 515, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE monitoring manager 515, or its sub-components, may be physically located at various positions, including being distributed such that portions of functions are implemented at different physical locations by one or more physical components. In some examples, the UE monitoring manager 515, or its sub-components, may be a separate and distinct component in accordance with various aspects of the present disclosure. In some examples, the UE monitoring manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505 as described herein. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
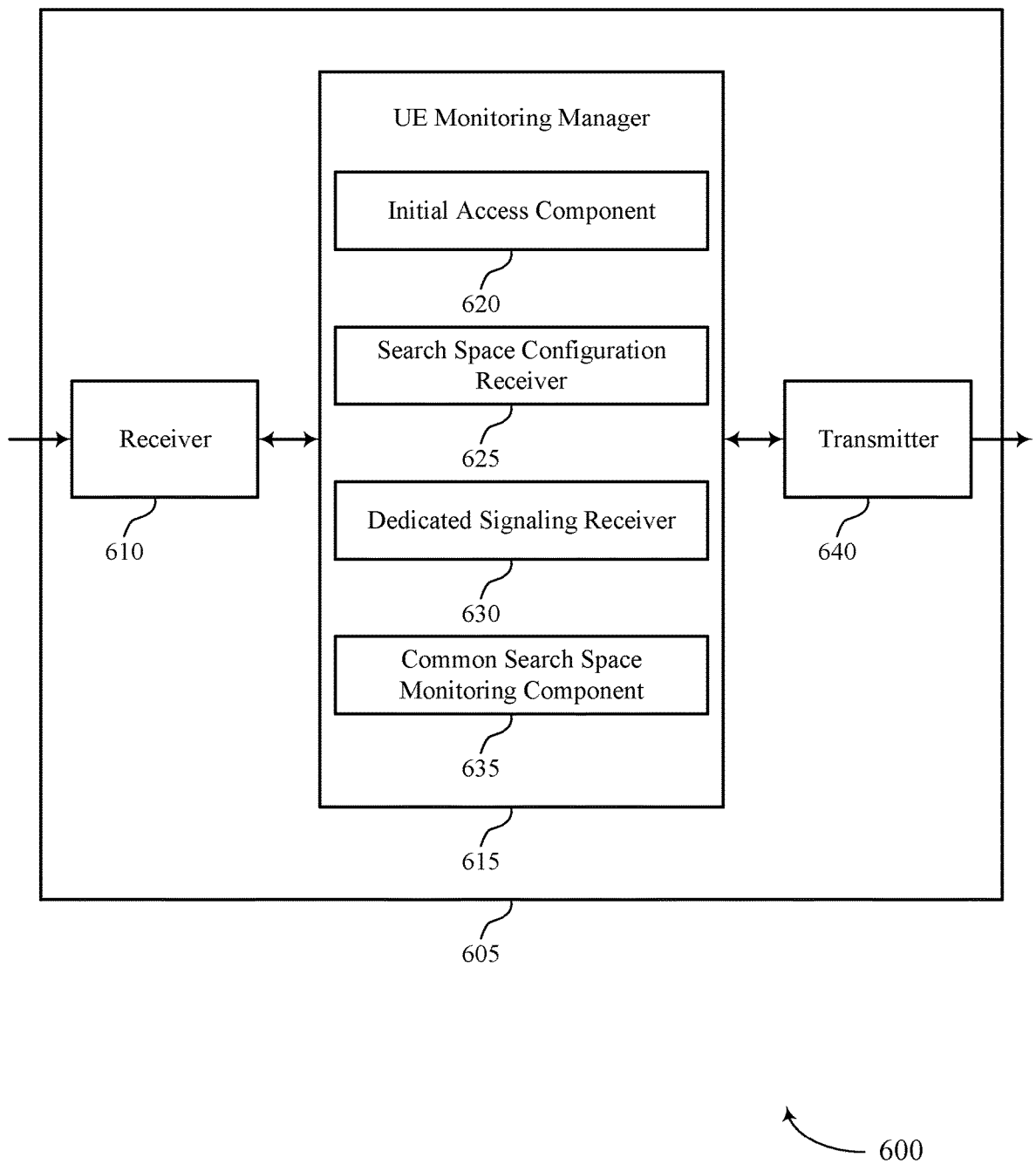

FIG. 6 shows a block diagram 600 of a device 605 that supports configuration of common search spaces in a downlink BWP in accordance with aspects of the present disclosure. The device 605 may be an example of aspects of a device 505, or a UE 115 as described herein. The device 605 may include a receiver 610, a UE monitoring manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to configuration of common search spaces in a downlink BWP, etc.). Information may be passed on to other components of the device 605. The receiver 610 may be an example of aspects of the transceiver 820 described with reference to FIG. 8. The receiver 610 may utilize a single antenna or a set of antennas.

The UE monitoring manager 615 may be an example of aspects of the UE monitoring manager 515 as described herein. The UE monitoring manager 615 may include an initial access component 620, a search space configuration receiver 625, a dedicated signaling receiver 630, and a common search space monitoring component 635. The UE monitoring manager 615 may be an example of aspects of the UE monitoring manager 810 described herein.

The initial access component 620 may perform an initial access procedure within an initial access bandwidth to obtain access to a cell.

The search space configuration receiver 625 may receive, during the initial access procedure, a first cell specific configuration of a first control channel common search space within the initial access bandwidth and an indication of a downlink BWP.

The dedicated signaling receiver 630 may receive dedicated signaling associated with (e.g., within) the downlink BWP.

The common search space monitoring component 635 may monitor at least one of the first control channel common search space, or a second control channel common search space within the downlink BWP based on the dedicated signaling, or both, for control information.

The transmitter 640 may transmit signals generated by other components of the device 605 as described herein. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
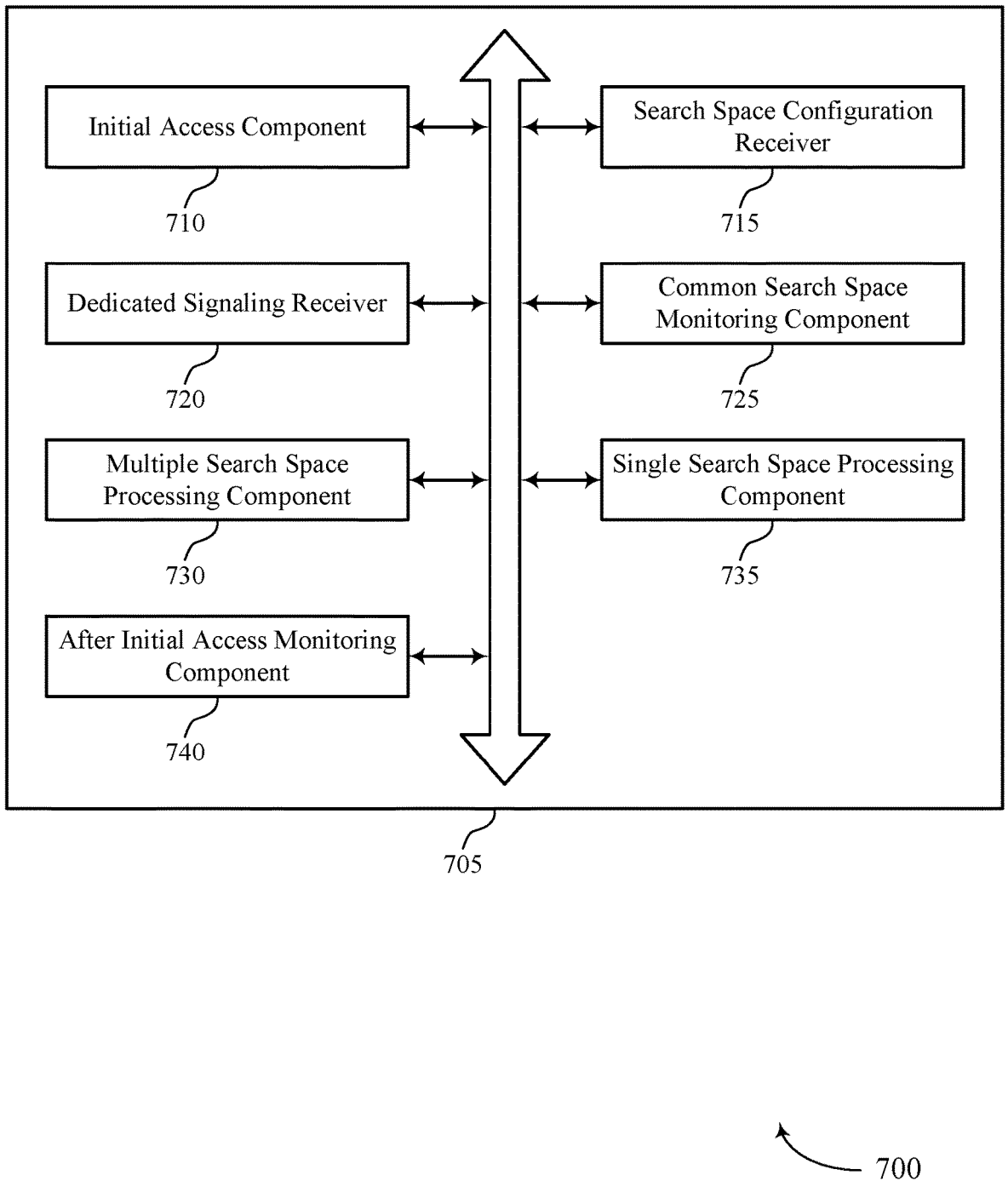
FIG. 7 shows a block diagram of a UE monitoring manager that supports configuration of common search spaces in a downlink bandwidth part in accordance with aspects of the present disclosure.

FIG. 7 shows a block diagram 700 of a UE monitoring manager 705 that supports configuration of common search spaces in a downlink BWP in accordance with aspects of the present disclosure. The UE monitoring manager 705 may be an example of aspects of a UE monitoring manager 515, a UE monitoring manager 615, or a UE monitoring manager 810 described herein. The UE monitoring manager 705 may include an initial access component 710, a search space configuration receiver 715, a dedicated signaling receiver 720, a common search space monitoring component 725, a multiple search space processing component 730, a single search space processing component 735, and an after initial access monitoring component 740. Each of these modules may communicate, directly or indirectly, with one another (e.g., via one or more buses).

The initial access component 710 may perform an initial access procedure within an initial access bandwidth to obtain access to a cell.

The search space configuration receiver 715 may receive, during the initial access procedure, a first cell specific configuration of a first control channel common search space within the initial access bandwidth and an indication of a downlink BWP. In some cases, the initial access bandwidth is included within a bandwidth of the downlink BWP, and the initial access bandwidth and the downlink BWP each have a same SCS. In some cases, the first cell specific configuration indicates at least one additional control channel common search space within the initial access bandwidth.

The dedicated signaling receiver 720 may receive dedicated signaling associated with (e.g., within) the downlink BWP. In some cases, the dedicated signaling is RRC signaling.

The common search space monitoring component 725 may monitor at least one of the first control channel common search space, or a second control channel common search space within the downlink BWP based on the dedicated signaling, or both, for control information.

In some examples, the common search space monitoring component 725 may monitor the first control channel common search space, a second control channel common search space within the downlink BWP, at least one additional control channel common search space within the initial access bandwidth, at least one additional control channel common search space within the downlink BWP, or any combination thereof, for control information based on the dedicated signaling. In some cases, the control information schedules a system information block, other system information, paging, random access of a physical downlink shared channel, or any combination thereof.

The multiple search space processing component 730 may determine that the UE is configured to process at least one of the first control channel common search space, or the second control channel common search space, or both, based on the first cell specific configuration and the dedicated signaling. In some cases, the first cell specific configuration indicates that the first control channel common search space is accessible after the initial access procedure and the dedicated signaling provides a second cell specific configuration of the second control channel common search space within the downlink BWP.

In some cases, the dedicated signaling indicates whether the first control channel common search space is accessible after the initial access procedure. In some cases, the dedicated signaling indicates that the first control channel common search space is accessible after the initial access procedure and provides a second cell specific configuration of the second control channel common search space within the downlink BWP.

The single search space processing component 735 may determine that the UE is to process one of the first control channel common search space and the second control channel common search space based on the dedicated signaling. In some examples, the single search space processing component 735 may determine to process the first control channel common search space based on the dedicated signaling indicating that the first control channel common search space is accessible after the initial access procedure and determining that the dedicated signaling does not include a second cell specific configuration of the second control channel common search space within the downlink BWP.

In some examples, the single search space processing component 735 may determine that the UE is to process the second control channel common search space based on the dedicated signaling including a second cell specific configuration of the second control channel common search space within the downlink BWP. In some examples, the single search space processing component 735 may determine to process the first control channel common search space based on determining that the dedicated signaling does not include a second cell specific configuration of the second control channel common search space within the downlink BWP.

In some examples, the single search space processing component 735 may determine to process the second control channel common search space based on determining that the dedicated signaling includes a second cell specific configuration of the second control channel common search space within the downlink BWP. In some examples, the single search space processing component 735 may determine that the UE is to process the second control channel common search space based on a SCS of the initial access bandwidth differing from a SCS of the downlink BWP.

In some examples, the single search space processing component 735 may determine that the UE is to process the second control channel common search space based on the initial access bandwidth not being entirely included within a bandwidth of the downlink BWP. In some cases, the dedicated signaling indicates whether the first control channel common search space is accessible after the initial access procedure.

The after initial access monitoring component 740 may determine to process the second control channel common search space based on determining that the dedicated signaling includes a second cell specific configuration of the second control channel common search space within the downlink BWP. In some examples, the after initial access monitoring component 740 may determine to process the first control channel common search space based on the dedicated signaling indicating that the first control channel common search space is accessible after the initial access procedure and determining that the dedicated signaling does not include a second cell specific configuration of the second control channel common search space within the downlink BWP. In some examples, the after initial access monitoring component 740 may determine that the UE is to process the second control channel common search space based on the dedicated signaling including a second cell specific configuration of the second control channel common search space within the downlink BWP.

Figure 8:
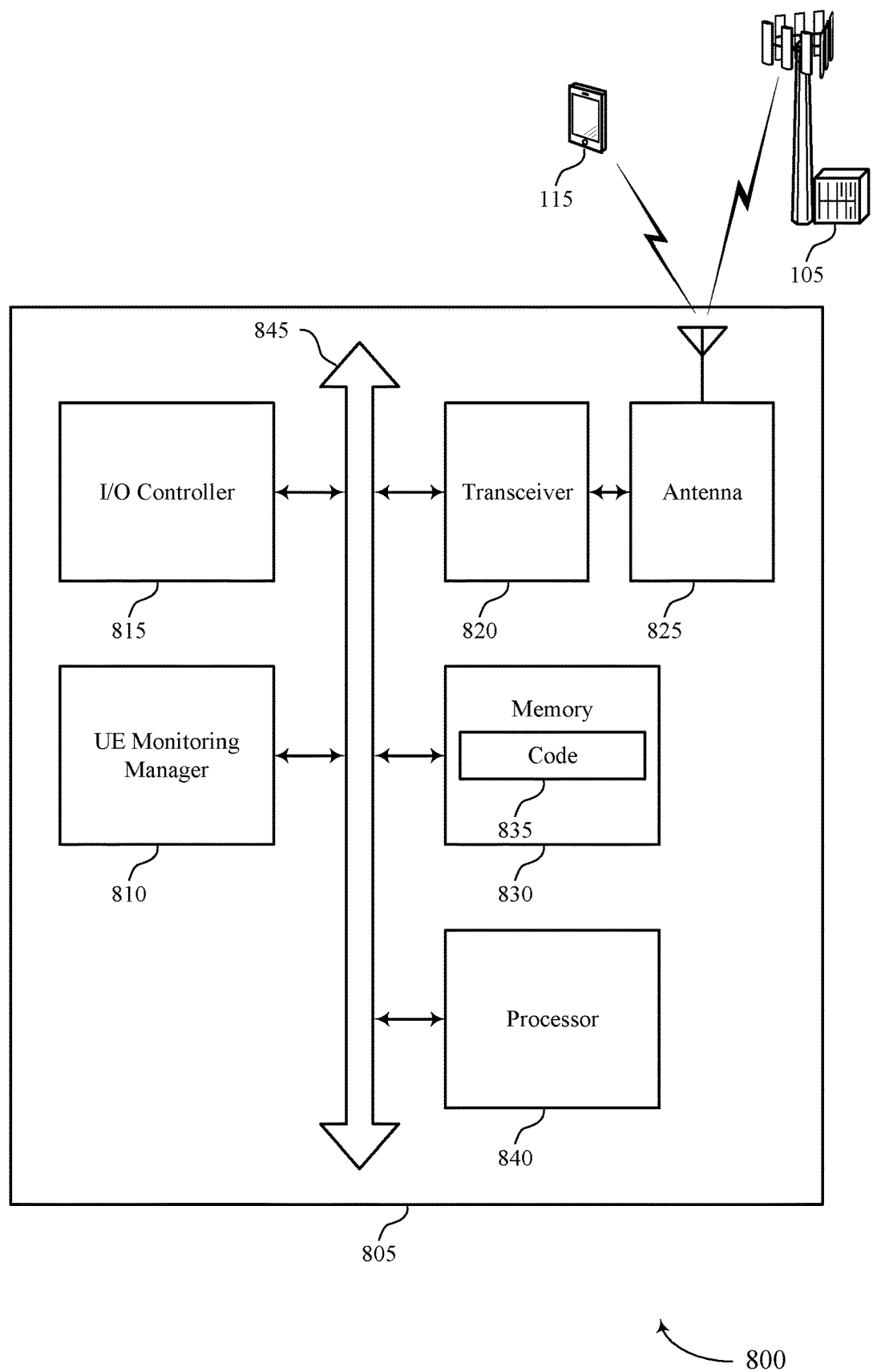
FIG. 8 shows a diagram of a system including a device that supports configuration of common search spaces in a downlink bandwidth part in accordance with aspects of the present disclosure.

FIG. 8 shows a diagram of a system 800 including a device 805 that supports configuration of common search spaces in a downlink BWP in accordance with aspects of the present disclosure. The device 805 may be an example of or include the components of device 505, device 605, or a UE 115 as described herein. The device 805 may include components for bi-directional voice and data communications including components for transmitting and receiving communications, including a UE monitoring manager 810, an I/O controller 815, a transceiver 820, an antenna 825, memory 830, and a processor 840. These components may be in electronic communication via one or more buses (e.g., bus 845).

The UE monitoring manager 810 may perform an initial access procedure within an initial access bandwidth to obtain access to a cell. In some cases, the UE monitoring manager 810 may receive, during the initial access procedure, a first cell specific configuration of a first control channel common search space within the initial access bandwidth and an indication of a downlink BWP. Additionally, the UE monitoring manager 810 may receive dedicated signaling associated with (e.g., within) the downlink BWP. The UE monitoring manager 810 may then monitor at least one of the first control channel common search space, or a second control channel common search space within the downlink BWP based on the dedicated signaling, or both, for control information.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions. In some examples, the device may communicate with a base station 105 or another UE 115 via the antenna 825.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting configuration of common search spaces in a downlink BWP).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
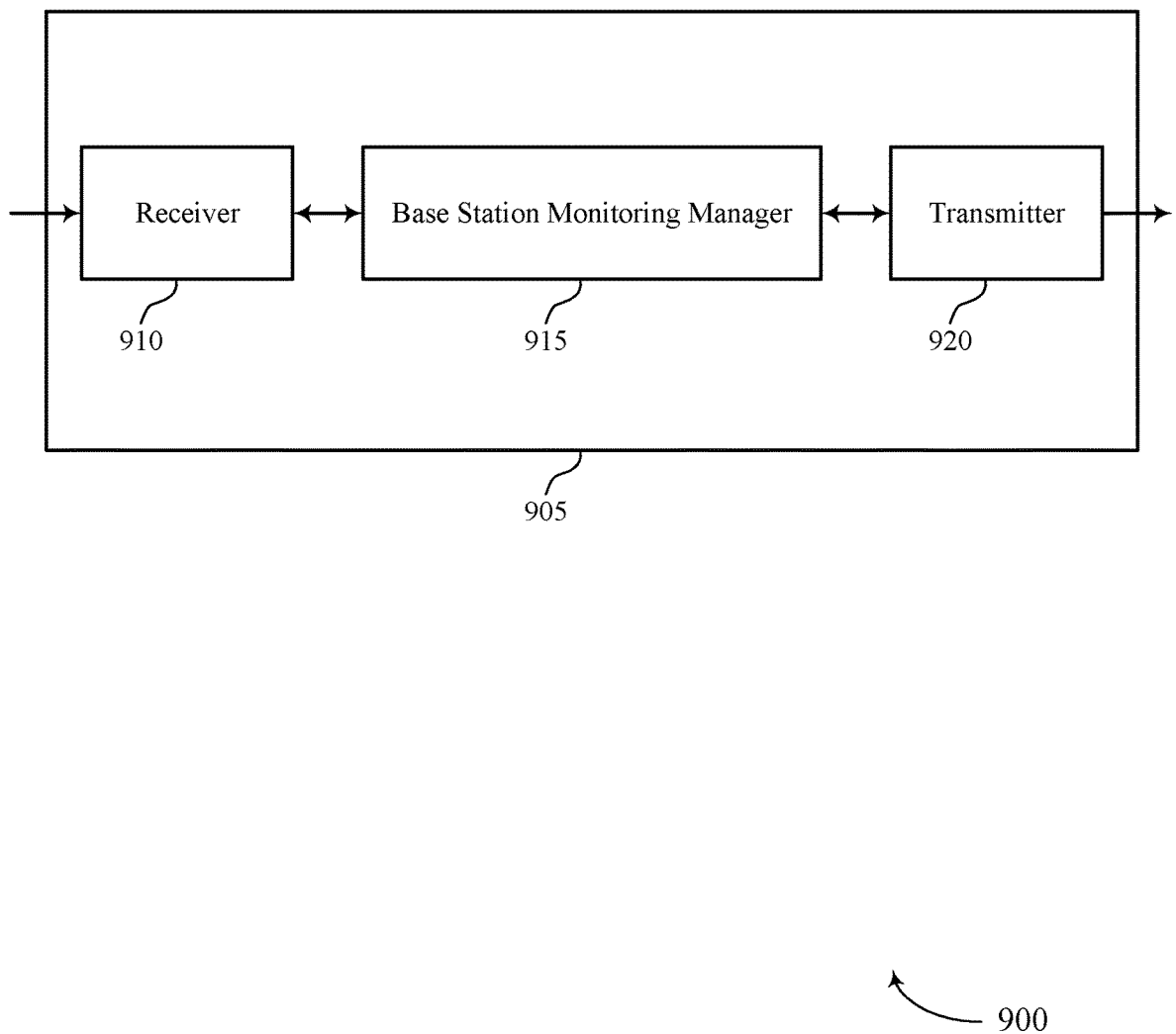
FIGS. 9 and 10 show block diagrams of devices that support configuration of common search spaces in a downlink bandwidth part in accordance with aspects of the present disclosure.

FIG. 9 shows a block diagram 900 of a device 905 that supports configuration of common search spaces in a downlink BWP in accordance with aspects of the present disclosure. The device 905 may be an example of aspects of a base station 105 as described herein. The device 905 may include a receiver 910, a base station monitoring manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to configuration of common search spaces in a downlink BWP, etc.). Information may be passed on to other components of the device 905. The receiver 910 may be an example of aspects of the transceiver 1220 described with reference to FIG. 12. The receiver 910 may utilize a single antenna or a set of antennas.

The base station monitoring manager 915 may perform an initial access procedure within an initial access bandwidth to provide a UE access to a cell of the base station. In some cases, the base station monitoring manager 915 may transmit, during the initial access procedure, a first cell specific configuration of a first control channel common search space within the initial access bandwidth and an indication of a downlink BWP. Additionally, the base station monitoring manager 915 may transmit dedicated signaling associated with (e.g., within) the downlink BWP. The base station monitoring manager 915 may then transmit control information within at least one of the first control channel common search space, or a second control channel common search space within the downlink BWP, or both, based on the dedicated signaling. The base station monitoring manager 915 may be an example of aspects of the base station monitoring manager 1210 described herein.

The base station monitoring manager 915, or its sub-components, may be implemented in hardware, code (e.g., software or firmware) executed by a processor, or any combination thereof. If implemented in code executed by a processor, the functions of the base station monitoring manager 915, or its sub-components may be executed by a general-purpose processor, a DSP, an ASIC, an FPGA or other PLD, discrete gate or transistor logic, discrete hardware components, or any combination thereof designed to perform the functions described in the present disclosure.

The base station monitoring manager 915, or its sub-components, may be physically located at various positions, including being distributed such that portions of functions are implemented at different physical locations by one or more physical components. In some examples, the base station monitoring manager 915, or its sub-components, may be a separate and distinct component in accordance with various aspects of the present disclosure. In some examples, the base station monitoring manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905 as described herein. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
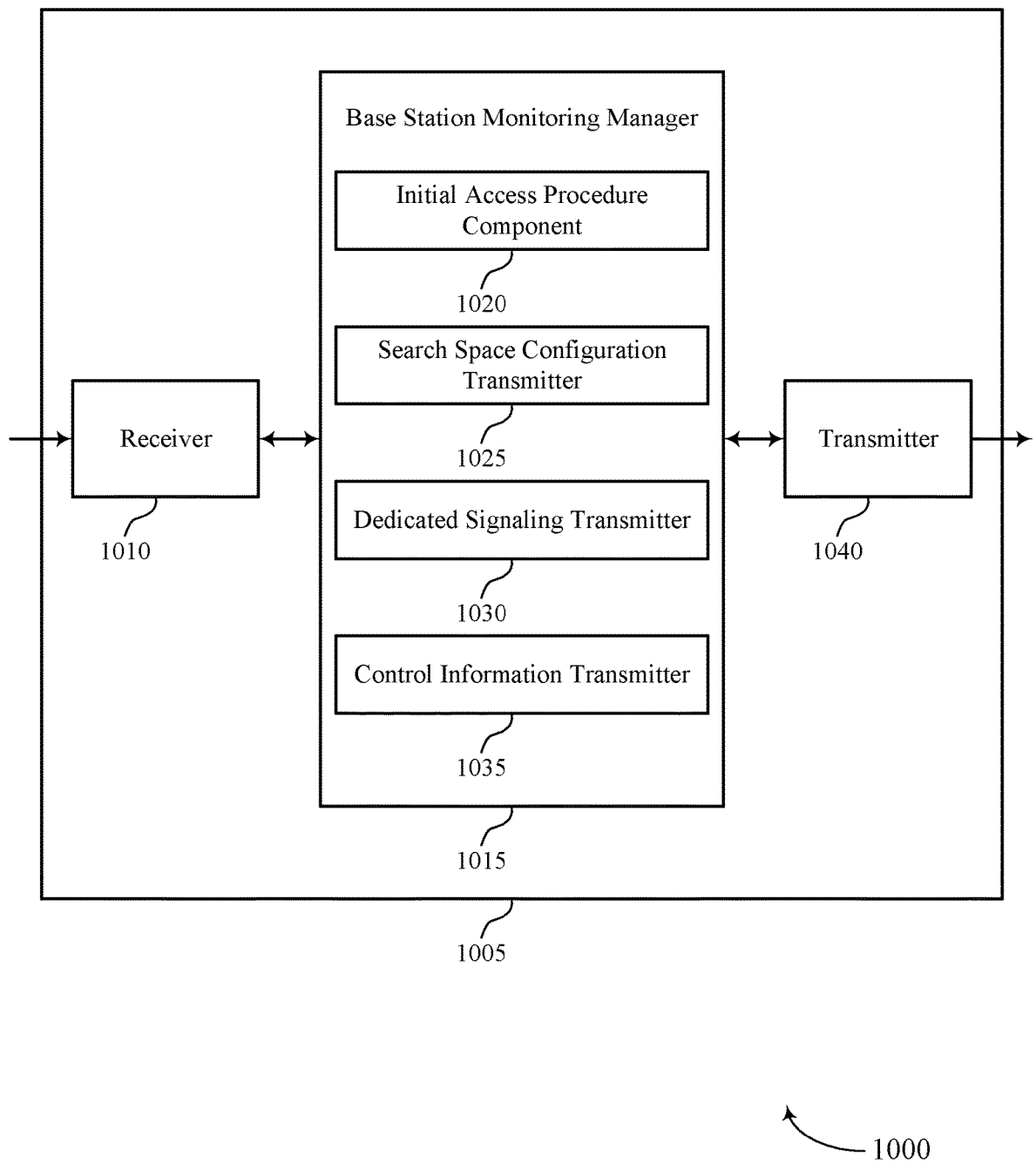

FIG. 10 shows a block diagram 1000 of a device 1005 that supports configuration of common search spaces in a downlink BWP in accordance with aspects of the present disclosure. The device 1005 may be an example of aspects of a device 905, or a base station 105 as described herein. The device 1005 may include a receiver 1010, a base station monitoring manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to configuration of common search spaces in a downlink BWP, etc.). Information may be passed on to other components of the device 1005. The receiver 1010 may be an example of aspects of the transceiver 1220 described with reference to FIG. 12. The receiver 1010 may utilize a single antenna or a set of antennas.

The base station monitoring manager 1015 may be an example of aspects of the base station monitoring manager 915 as described herein. The base station monitoring manager 1015 may include an initial access procedure component 1020, a search space configuration transmitter 1025, a dedicated signaling transmitter 1030, and a control information transmitter 1035. The base station monitoring manager 1015 may be an example of aspects of the base station monitoring manager 1210 described herein.

The initial access procedure component 1020 may perform an initial access procedure within an initial access bandwidth to provide a UE access to a cell of the base station.

The search space configuration transmitter 1025 may transmit, during the initial access procedure, a first cell specific configuration of a first control channel common search space within the initial access bandwidth and an indication of a downlink BWP.

The dedicated signaling transmitter 1030 may transmit dedicated signaling associated with (e.g., within) the downlink BWP.

The control information transmitter 1035 may transmit control information within at least one of the first control channel common search space, or a second control channel common search space within the downlink BWP, or both, based on the dedicated signaling.

The transmitter 1040 may transmit signals generated by other components of the device 1005 as described herein. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
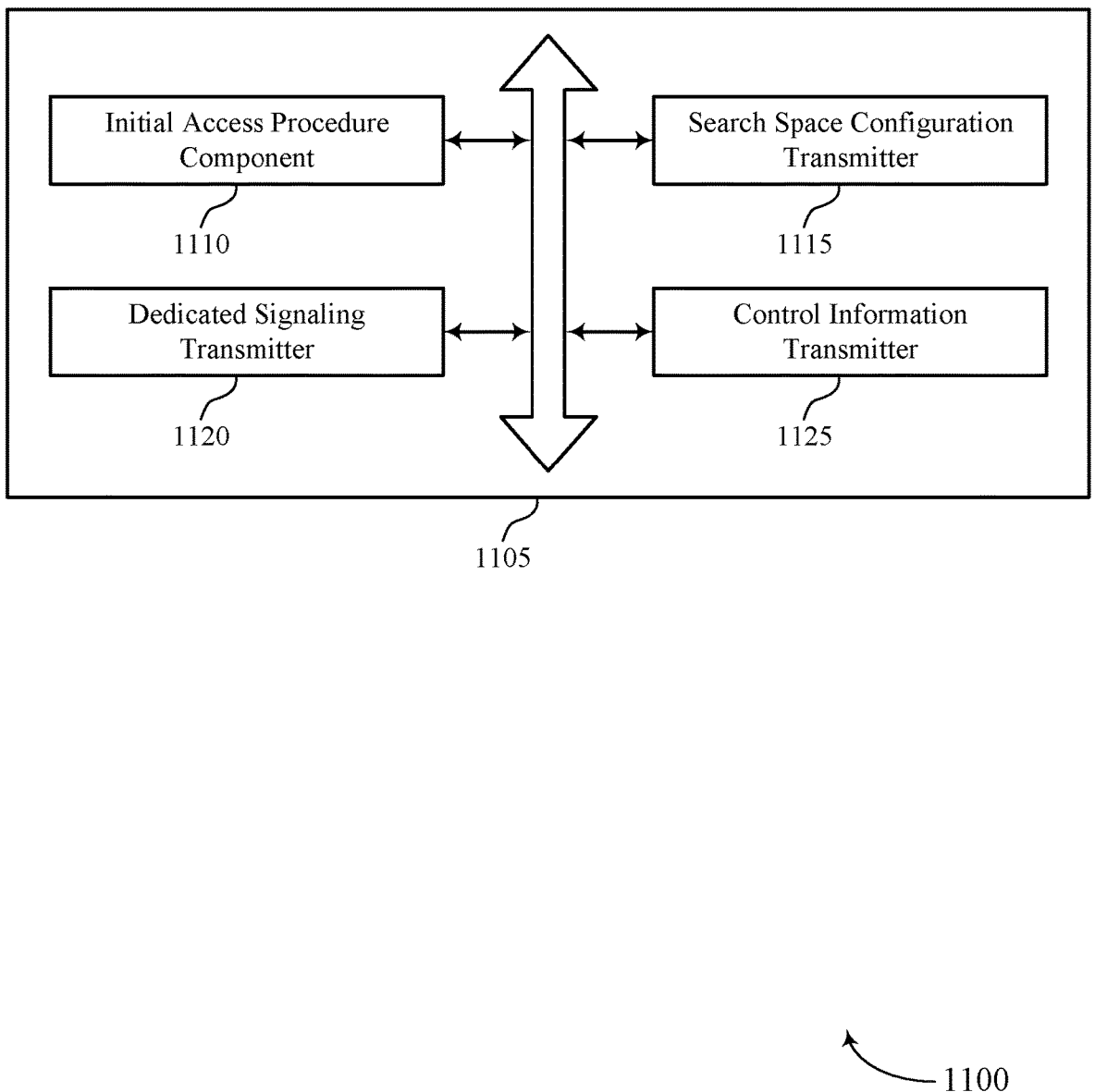
FIG. 11 shows a block diagram of a base station monitoring manager that supports configuration of common search spaces in a downlink bandwidth part in accordance with aspects of the present disclosure.

FIG. 11 shows a block diagram 1100 of a base station monitoring manager 1105 that supports configuration of common search spaces in a downlink BWP in accordance with aspects of the present disclosure. The base station monitoring manager 1105 may be an example of aspects of a base station monitoring manager 915, a base station monitoring manager 1015, or a base station monitoring manager 1210 described herein. The base station monitoring manager 1105 may include an initial access procedure component 1110, a search space configuration transmitter 1115, a dedicated signaling transmitter 1120, and a control information transmitter 1125. Each of these modules may communicate, directly or indirectly, with one another (e.g., via one or more buses).

The initial access procedure component 1110 may perform an initial access procedure within an initial access bandwidth to provide a UE access to a cell of the base station.

The search space configuration transmitter 1115 may transmit, during the initial access procedure, a first cell specific configuration of a first control channel common search space within the initial access bandwidth and an indication of a downlink BWP. In some examples, the search space configuration transmitter 1115 may transmit a first cell specific configuration indicating that the first control channel common search space is accessible after the initial access procedure, where the dedicated signaling provides a second cell specific configuration of the second control channel common search space within the downlink BWP.

In some cases, the initial access bandwidth is included within a bandwidth of the downlink BWP, and the initial access bandwidth and the downlink BWP each have a same SCS. In some cases, a SCS of the initial access bandwidth differs from a SCS of the downlink BWP. In some cases, the initial access bandwidth is not entirely included within a bandwidth of the downlink BWP.

The dedicated signaling transmitter 1120 may transmit dedicated signaling associated with (e.g., within) the downlink BWP. In some cases, the dedicated signaling indicates whether the first control channel common search space is accessible after the initial access procedure. In some cases, the dedicated signaling indicates that the first control channel common search space is accessible after the initial access procedure and provides a second cell specific configuration of the second control channel common search space within the downlink BWP.

In some cases, the dedicated signaling indicates that the first control channel common search space is accessible after the initial access procedure and does not include a second cell specific configuration of the second control channel common search space within the downlink BWP. In some cases, the dedicated signaling includes a second cell specific configuration of the second control channel common search space within the downlink BWP. In some cases, the dedicated signaling does not include a second cell specific configuration of the second control channel common search space within the downlink BWP. In some cases, the dedicated signaling is RRC signaling.

The control information transmitter 1125 may transmit control information within at least one of the first control channel common search space, or a second control channel common search space within the downlink BWP, or both, based on the dedicated signaling. In some cases, the control information schedules a system information block, other system information, paging, random access of a physical downlink shared channel, or any combination thereof.

Figure 12:
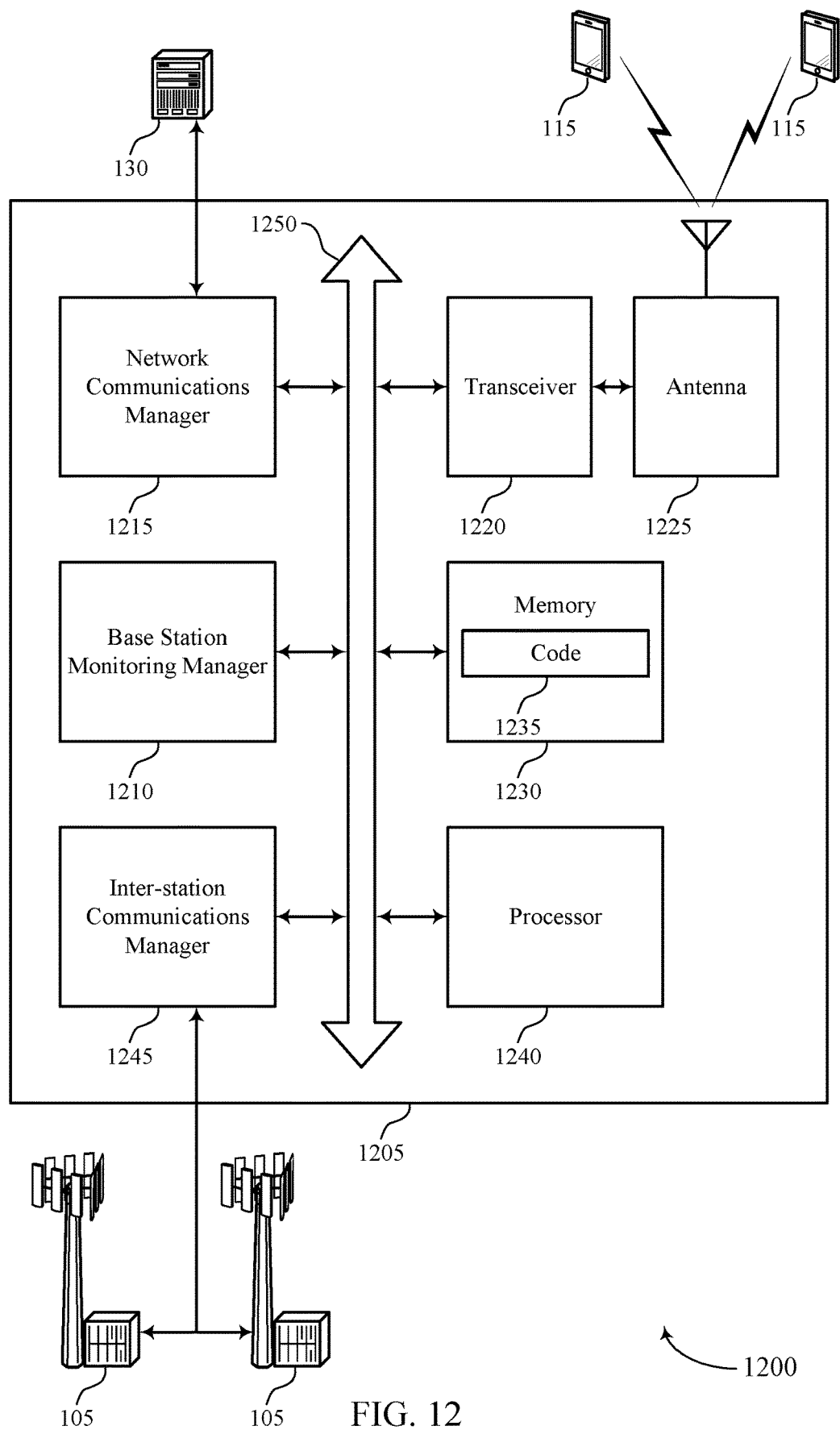
FIG. 12 shows a diagram of a system including a device that supports configuration of common search spaces in a downlink bandwidth part in accordance with aspects of the present disclosure.

FIG. 12 shows a diagram of a system 1200 including a device 1205 that supports configuration of common search spaces in a downlink BWP in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station monitoring manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station monitoring manager 1210 may perform an initial access procedure within an initial access bandwidth to provide a UE access to a cell of the base station. In some cases, the base station monitoring manager 1210 may transmit, during the initial access procedure, a first cell specific configuration of a first control channel common search space within the initial access bandwidth and an indication of a downlink BWP. Additionally, the base station monitoring manager 1210 may transmit dedicated signaling associated with (e.g., within) the downlink BWP. The base station monitoring manager 1210 may then transmit control information within at least one of the first control channel common search space, or a second control channel common search space within the downlink BWP, or both, based on the dedicated signaling.

The network communications manager 1215 may manage communications with the core network 130 (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting configuration of common search spaces in a downlink BWP).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
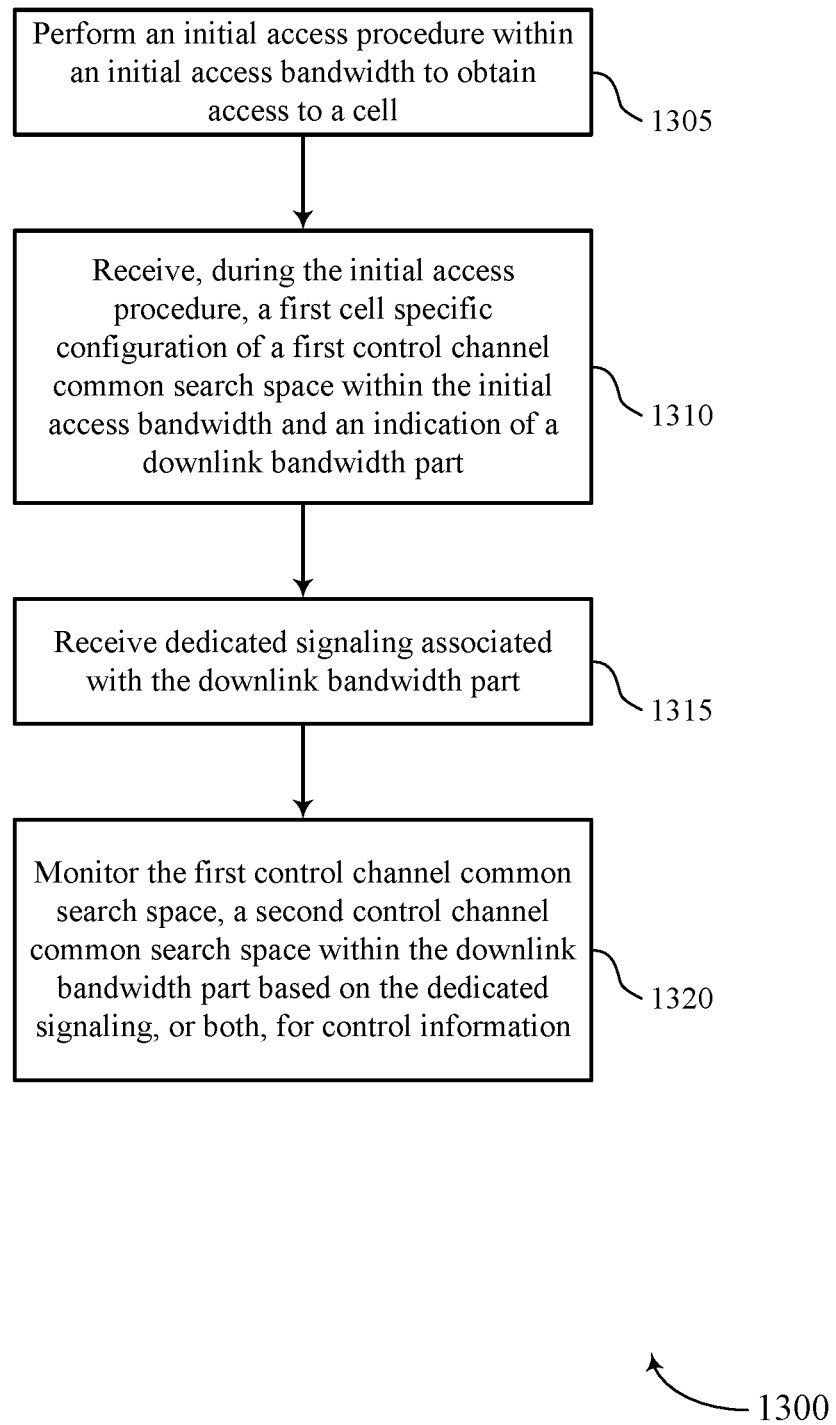
FIGS. 13 through 17 show flowcharts illustrating methods that support configuration of common search spaces in a downlink bandwidth part in accordance with aspects of the present disclosure.

FIG. 13 shows a flowchart illustrating a method 1300 that supports configuration of common search spaces in a downlink BWP in accordance with aspects of the present disclosure. The operations of method 1300 may be implemented by a UE 115 or its components as described herein. For example, the operations of method 1300 may be performed by a UE monitoring manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may perform an initial access procedure within an initial access bandwidth to obtain access to a cell. The operations of 1305 may be performed according to the methods described herein. In some examples, aspects of the operations of 1305 may be performed by an initial access component as described with reference to FIGS. 5 through 8.

At 1310, the UE may receive, during the initial access procedure, a first cell specific configuration of a first control channel common search space within the initial access bandwidth and an indication of a downlink BWP. The operations of 1310 may be performed according to the methods described herein. In some examples, aspects of the operations of 1310 may be performed by a search space configuration receiver as described with reference to FIGS. 5 through 8.

At 1315, the UE may receive dedicated signaling associated with (e.g., within) the downlink BWP. The operations of 1315 may be performed according to the methods described herein. In some examples, aspects of the operations of 1315 may be performed by a dedicated signaling receiver as described with reference to FIGS. 5 through 8.

At 1320, the UE may monitor at least one of the first control channel common search space, or a second control channel common search space within the downlink BWP based on the dedicated signaling, or both, for control information. The operations of 1320 may be performed according to the methods described herein. In some examples, aspects of the operations of 1320 may be performed by a common search space monitoring component as described with reference to FIGS. 5 through 8.

Figure 14:
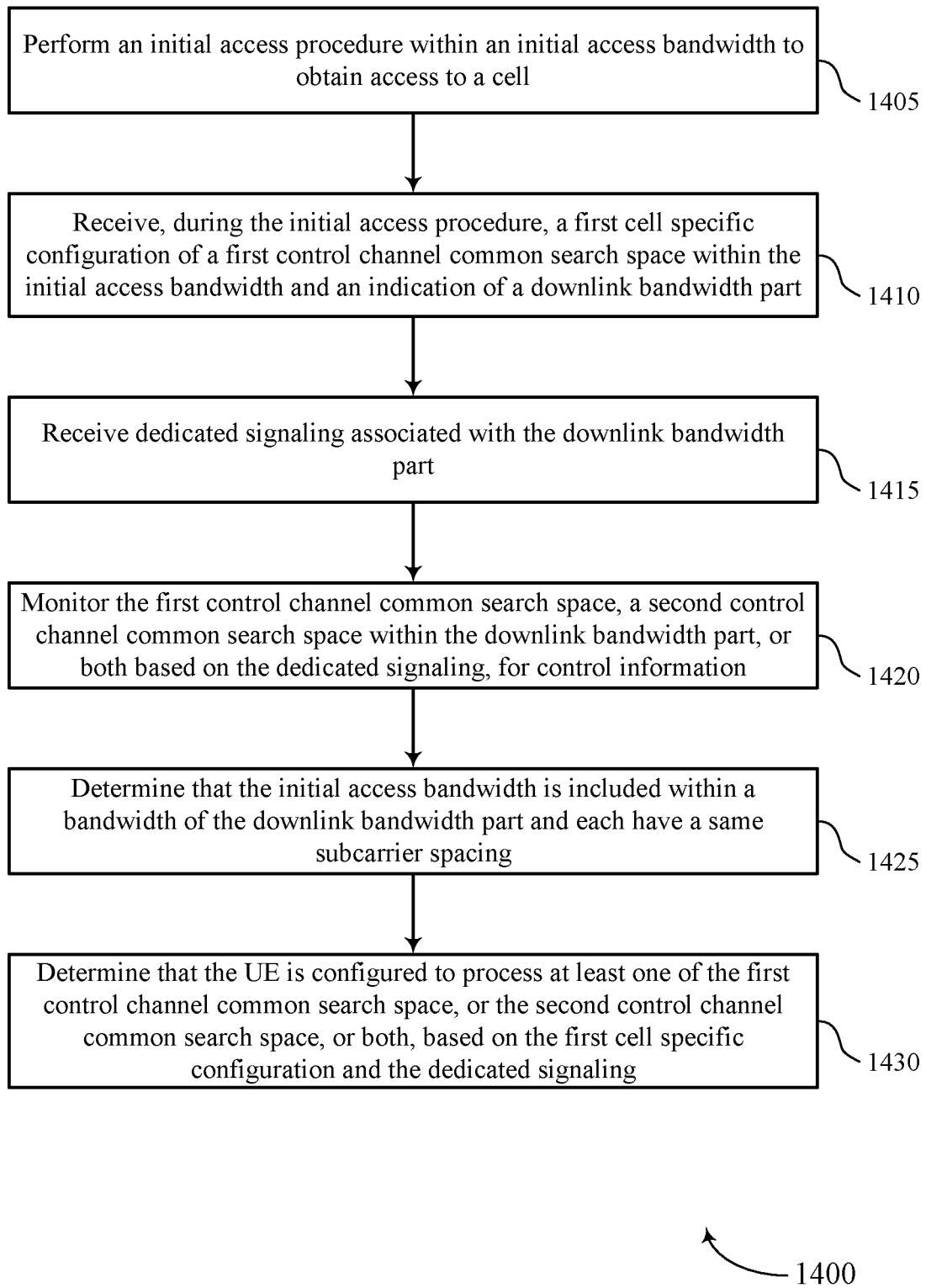

FIG. 14 shows a flowchart illustrating a method 1400 that supports configuration of common search spaces in a downlink BWP in accordance with aspects of the present disclosure. The operations of method 1400 may be implemented by a UE 115 or its components as described herein. For example, the operations of method 1400 may be performed by a UE monitoring manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may perform an initial access procedure within an initial access bandwidth to obtain access to a cell. The operations of 1405 may be performed according to the methods described herein. In some examples, aspects of the operations of 1405 may be performed by an initial access component as described with reference to FIGS. 5 through 8.

At 1410, the UE may receive, during the initial access procedure, a first cell specific configuration of a first control channel common search space within the initial access bandwidth and an indication of a downlink BWP. The operations of 1410 may be performed according to the methods described herein. In some examples, aspects of the operations of 1410 may be performed by a search space configuration receiver as described with reference to FIGS. 5 through 8.

At 1415, the UE may receive dedicated signaling associated with (e.g., within) the downlink BWP. The operations of 1415 may be performed according to the methods described herein. In some examples, aspects of the operations of 1415 may be performed by a dedicated signaling receiver as described with reference to FIGS. 5 through 8.

At 1420, the UE may monitor at least one of the first control channel common search space, or a second control channel common search space within the downlink BWP based on the dedicated signaling, or both, for control information. The operations of 1420 may be performed according to the methods described herein. In some examples, aspects of the operations of 1420 may be performed by a common search space monitoring component as described with reference to FIGS. 5 through 8.

At 1425, the UE may determine the initial access bandwidth is included within a bandwidth of the downlink BWP, and determine the initial access bandwidth and the downlink BWP each have a same SCS. The operations of 1425 may be performed according to the methods described herein. In some examples, aspects of the operations of 1425 may be performed by a search space configuration receiver as described with reference to FIGS. 5 through 8.

At 1430, the UE may determine that the UE is configured to process at least one of the first control channel common search space, or the second control channel common search space, or both, based on the first cell specific configuration and the dedicated signaling. The operations of 1430 may be performed according to the methods described herein. In some examples, aspects of the operations of 1430 may be performed by a multiple search space processing component as described with reference to FIGS. 5 through 8.

Figure 15:
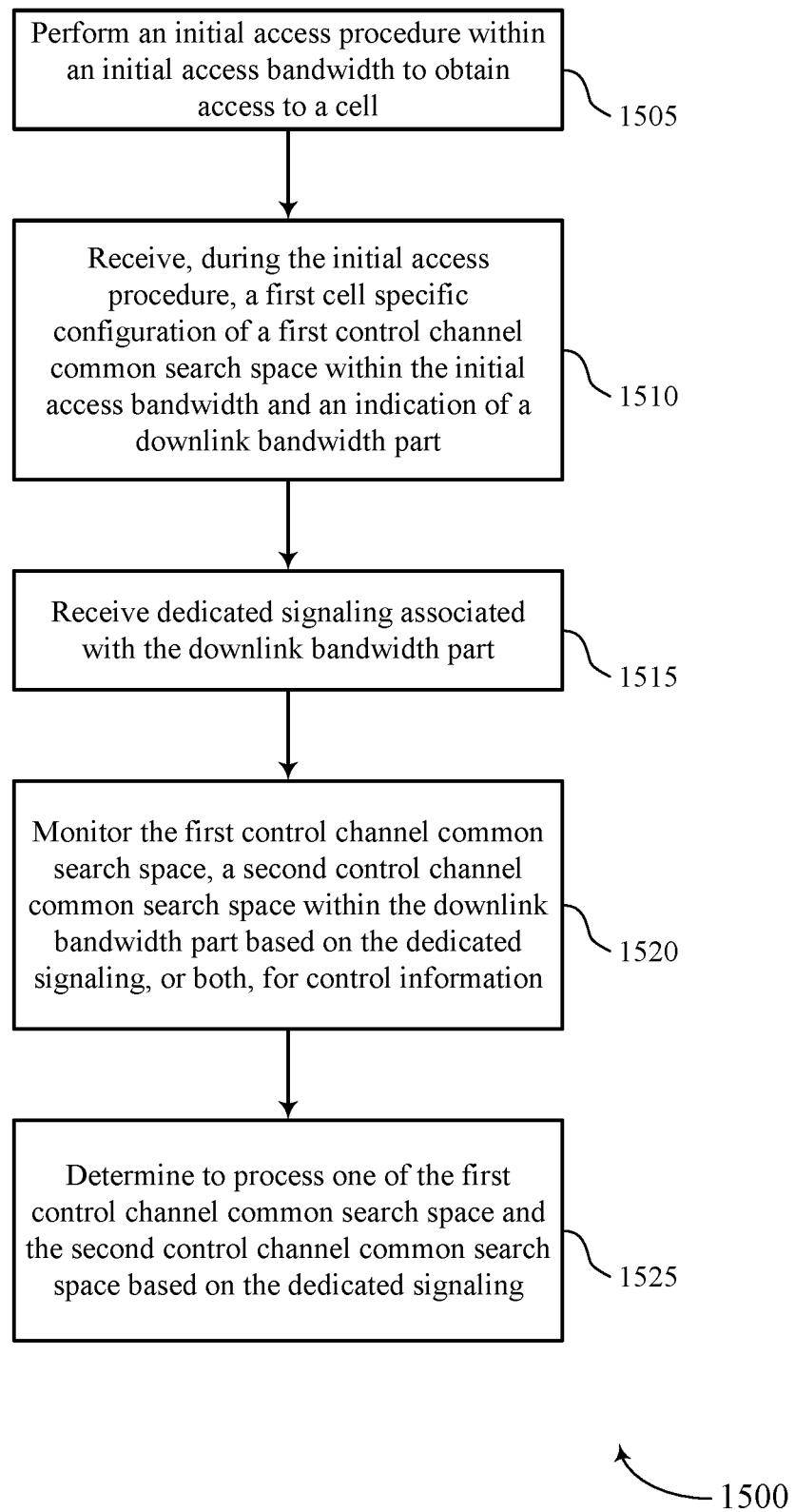

FIG. 15 shows a flowchart illustrating a method 1500 that supports configuration of common search spaces in a downlink BWP in accordance with aspects of the present disclosure. The operations of method 1500 may be implemented by a UE 115 or its components as described herein. For example, the operations of method 1500 may be performed by a UE monitoring manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may perform an initial access procedure within an initial access bandwidth to obtain access to a cell. The operations of 1505 may be performed according to the methods described herein. In some examples, aspects of the operations of 1505 may be performed by an initial access component as described with reference to FIGS. 5 through 8.

At 1510, the UE may receive, during the initial access procedure, a first cell specific configuration of a first control channel common search space within the initial access bandwidth and an indication of a downlink BWP. The operations of 1510 may be performed according to the methods described herein. In some examples, aspects of the operations of 1510 may be performed by a search space configuration receiver as described with reference to FIGS. 5 through 8.

At 1515, the UE may receive dedicated signaling associated with (e.g., within) the downlink BWP. The operations of 1515 may be performed according to the methods described herein. In some examples, aspects of the operations of 1515 may be performed by a dedicated signaling receiver as described with reference to FIGS. 5 through 8.

At 1520, the UE may monitor at least one of the first control channel common search space, or a second control channel common search space within the downlink BWP based on the dedicated signaling, or both, for control information. The operations of 1520 may be performed according to the methods described herein. In some examples, aspects of the operations of 1520 may be performed by a common search space monitoring component as described with reference to FIGS. 5 through 8.

At 1525, the UE may determine process one of the first control channel common search space and the second control channel common search space based on the dedicated signaling. The operations of 1525 may be performed according to the methods described herein. In some examples, aspects of the operations of 1525 may be performed by a single search space processing component as described with reference to FIGS. 5 through 8.

Figure 16:
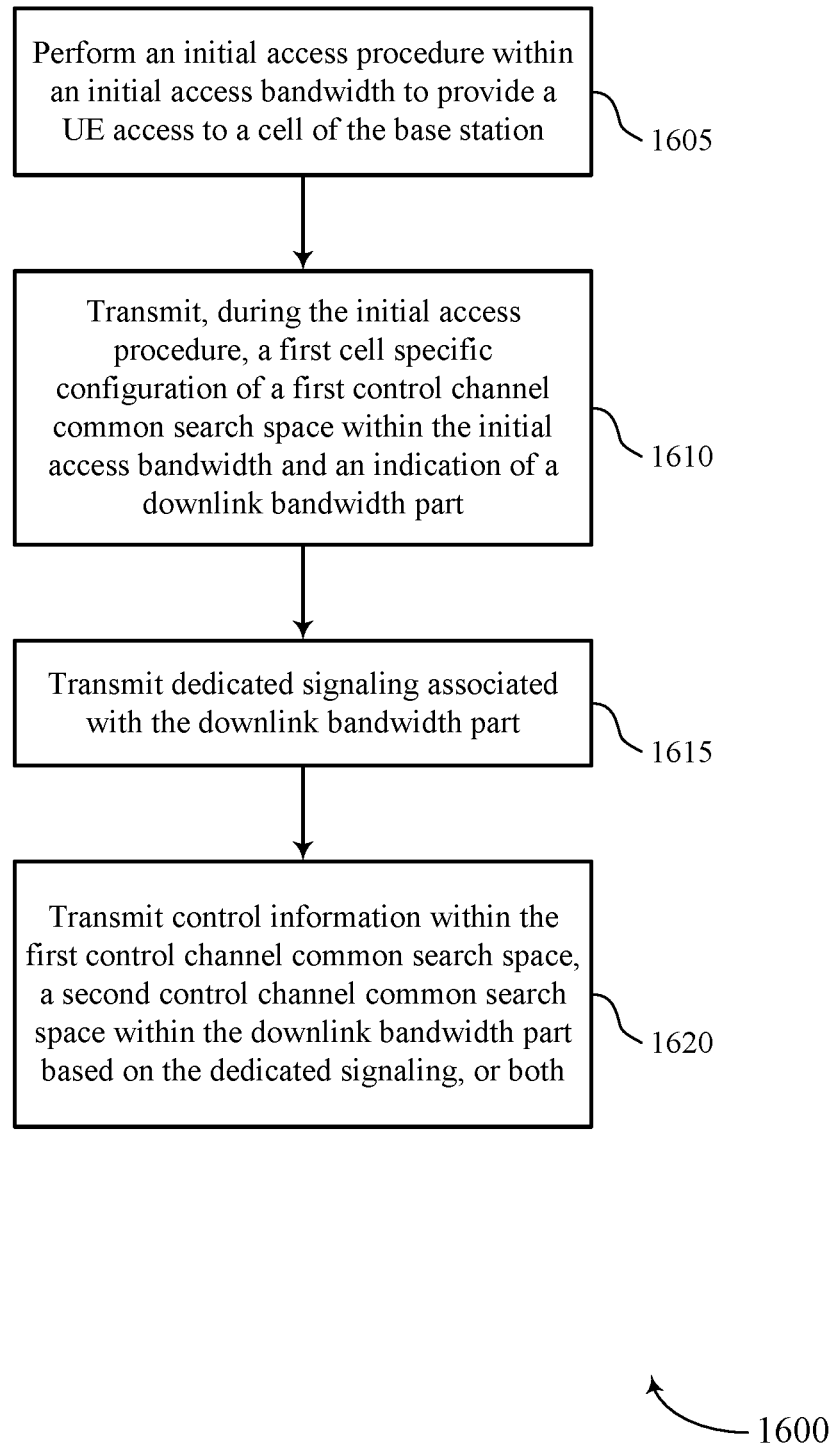

FIG. 16 shows a flowchart illustrating a method 1600 that supports configuration of common search spaces in a downlink BWP in accordance with aspects of the present disclosure. The operations of method 1600 may be implemented by a base station 105 or its components as described herein. For example, the operations of method 1600 may be performed by a base station monitoring manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may perform an initial access procedure within an initial access bandwidth to provide a UE access to a cell of the base station. The operations of 1605 may be performed according to the methods described herein. In some examples, aspects of the operations of 1605 may be performed by an initial access procedure component as described with reference to FIGS. 9 through 12.

At 1610, the base station may transmit, during the initial access procedure, a first cell specific configuration of a first control channel common search space within the initial access bandwidth and an indication of a downlink BWP. The operations of 1610 may be performed according to the methods described herein. In some examples, aspects of the operations of 1610 may be performed by a search space configuration transmitter as described with reference to FIGS. 9 through 12.

At 1615, the base station may transmit dedicated signaling associated with (e.g., within) the downlink BWP. The operations of 1615 may be performed according to the methods described herein. In some examples, aspects of the operations of 1615 may be performed by a dedicated signaling transmitter as described with reference to FIGS. 9 through 12.

At 1620, the base station may transmit control information within at least one of the first control channel common search space, or a second control channel common search space within the downlink BWP based on the dedicated signaling, or both. The operations of 1620 may be performed according to the methods described herein. In some examples, aspects of the operations of 1620 may be performed by a control information transmitter as described with reference to FIGS. 9 through 12.

Figure 17:
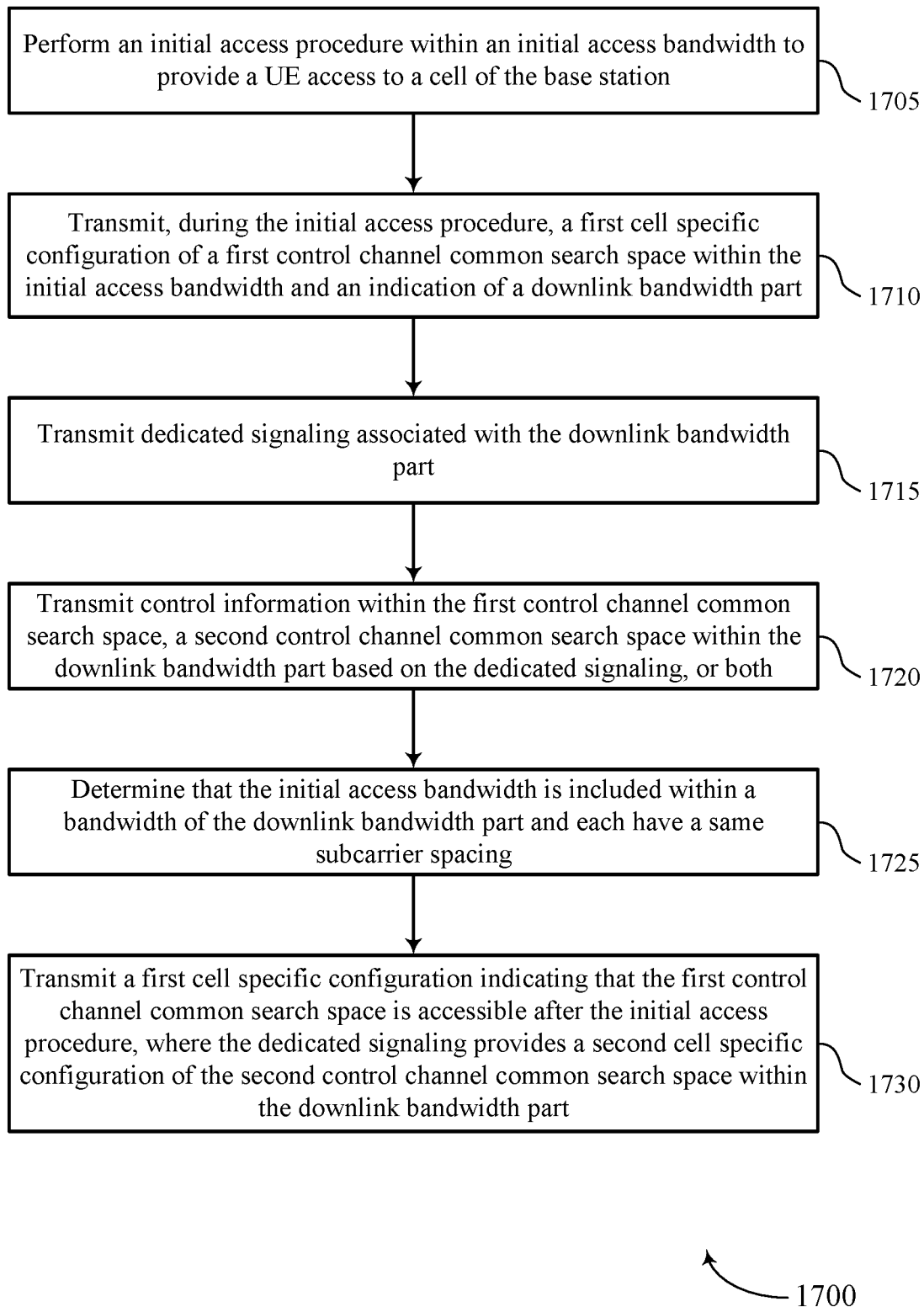

FIG. 17 shows a flowchart illustrating a method 1700 that supports configuration of common search spaces in a downlink BWP in accordance with aspects of the present disclosure. The operations of method 1700 may be implemented by a base station 105 or its components as described herein. For example, the operations of method 1700 may be performed by a base station monitoring manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may perform an initial access procedure within an initial access bandwidth to provide a UE access to a cell of the base station. The operations of 1705 may be performed according to the methods described herein. In some examples, aspects of the operations of 1705 may be performed by an initial access procedure component as described with reference to FIGS. 9 through 12.

At 1710, the base station may transmit, during the initial access procedure, a first cell specific configuration of a first control channel common search space within the initial access bandwidth and an indication of a downlink BWP. The operations of 1710 may be performed according to the methods described herein. In some examples, aspects of the operations of 1710 may be performed by a search space configuration transmitter as described with reference to FIGS. 9 through 12.

At 1715, the base station may transmit dedicated signaling associated with (e.g., within) the downlink BWP. The operations of 1715 may be performed according to the methods described herein. In some examples, aspects of the operations of 1715 may be performed by a dedicated signaling transmitter as described with reference to FIGS. 9 through 12.

At 1720, the base station may transmit control information within at least one of the first control channel common search space, or a second control channel common search space within the downlink BWP, or both, based on the dedicated signaling. The operations of 1720 may be performed according to the methods described herein. In some examples, aspects of the operations of 1720 may be performed by a control information transmitter as described with reference to FIGS. 9 through 12.

At 1725, the base station may determine the initial access bandwidth is included within a bandwidth of the downlink BWP, and determine the initial access bandwidth and the downlink BWP each have a same SCS. The operations of 1725 may be performed according to the methods described herein. In some examples, aspects of the operations of 1725 may be performed by a search space configuration transmitter as described with reference to FIGS. 9 through 12.

At 1730, the base station may transmit a first cell specific configuration indicating that the first control channel common search space is accessible after the initial access procedure, where the dedicated signaling provides a second cell specific configuration of the second control channel common search space within the downlink BWP. The operations of 1730 may be performed according to the methods described herein. In some examples, aspects of the operations of 1730 may be performed by a search space configuration transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of further embodiments of the present invention:

Embodiment 1: A method for wireless communication performed by a user equipment (UE), comprising: performing an initial access procedure within an initial access bandwidth to obtain access to a cell; receiving, during the initial access procedure, a first cell specific configuration of a first control channel common search space within the initial access bandwidth and an indication of a downlink bandwidth part; receiving dedicated signaling associated with the downlink bandwidth part; and monitoring at least one of the first control channel common search space, or a second control channel common search space within the downlink bandwidth part based at least in part on the dedicated signaling, or both, for control information.

Embodiment 2: The method of embodiment 1, wherein the initial access bandwidth is included within a bandwidth of the downlink bandwidth part, and the initial access bandwidth and the downlink BWP each have a same subcarrier spacing.

Embodiment 3: The method of any of embodiments 1 to 2, wherein the monitoring further comprises: determining that the UE is configured to process at least one of the first control channel common search space, or the second control channel common search space, or both, based at least in part on the first cell specific configuration and the dedicated signaling.

Embodiment 4: The method of any of embodiments 1 to 3, wherein the first cell specific configuration indicates that the first control channel common search space is accessible after the initial access procedure and the dedicated signaling provides a second cell specific configuration of the second control channel common search space within the downlink bandwidth part.

Embodiment 5: The method of any of embodiments 1 to 4, wherein the dedicated signaling indicates whether the first control channel common search space is accessible after the initial access procedure.

Embodiment 6: The method of any of embodiments 1 to 5, wherein the dedicated signaling indicates that the first control channel common search space is accessible after the initial access procedure and provides a second cell specific configuration of the second control channel common search space within the downlink bandwidth part.

Embodiment 7: The method of any of embodiments 1 to 6, wherein the monitoring further comprises: determining that the UE is to process (e.g., only) one of the first control channel common search space and the second control channel common search space based at least in part on the dedicated signaling.

Embodiment 8: The method of embodiment 7, wherein the determining further comprises: determining to process the first control channel common search space based at least in part on the dedicated signaling indicating that the first control channel common search space is accessible after the initial access procedure and determining that the dedicated signaling does not include a second cell specific configuration of the second control channel common search space within the downlink bandwidth part.

Embodiment 9: The method of any of embodiments 7 to 8, wherein the determining further comprises: determining that the UE is to process the second control channel common search space based at least in part on the dedicated signaling including a second cell specific configuration of the second control channel common search space within the downlink bandwidth part.

Embodiment 10: The method of any of embodiments 7 to 9, wherein the determining further comprises: determining to process the first control channel common search space based at least in part on determining that the dedicated signaling does not include a second cell specific configuration of the second control channel common search space within the downlink bandwidth part.

Embodiment 11: The method of any of embodiments 7 to 10, wherein the determining further comprises: determining to process the second control channel common search space based at least in part on determining that the dedicated signaling includes a second cell specific configuration of the second control channel common search space within the downlink bandwidth part.

Embodiment 12: The method of any of embodiments 7 to 11, wherein the dedicated signaling indicates whether the first control channel common search space is accessible after the initial access procedure.

Embodiment 13: The method of embodiment 12, wherein the determining further comprises: determining to process the second control channel common search space based at least in part on determining that the dedicated signaling includes a second cell specific configuration of the second control channel common search space within the downlink bandwidth part.

Embodiment 14: The method of any of embodiments 12 to 13, wherein the determining further comprises: determining to process the first control channel common search space based at least in part on the dedicated signaling indicating that the first control channel common search space is accessible after the initial access procedure and determining that the dedicated signaling does not include a second cell specific configuration of the second control channel common search space within the downlink bandwidth part.

Embodiment 15: The method of any of embodiments 12 to 14, wherein the determining further comprises: determining that the UE is to process the second control channel common search space based at least in part on the dedicated signaling including a second cell specific configuration of the second control channel common search space within the downlink bandwidth part.

Embodiment 16: The method of any of embodiments 1 to 15, wherein the monitoring further comprises: determining that the UE is to process (e.g., only) one of the first control channel common search space and the second control channel common search space based at least in part on the dedicated signaling.

Embodiment 17: The method of embodiment 16, wherein the monitoring further comprises: determining that the UE is to process the second control channel common search space based at least in part on a subcarrier spacing of the initial access bandwidth differing from a subcarrier spacing of the downlink bandwidth part.

Embodiment 18: The method of any of embodiments 16 to 17, wherein the monitoring further comprises: determining that the UE is to process the second control channel common search space based at least in part on the initial access bandwidth not being entirely included within a bandwidth of the downlink bandwidth part.

Embodiment 19: The method of any of embodiments 1 to 18, wherein the control information schedules a system information block, other system information, paging, random access of a physical downlink shared channel, or any combination thereof.

Embodiment 20: The method of any of embodiments 1 to 19, wherein the dedicated signaling is radio resource control (RRC) signaling.

Embodiment 21: The method of any of embodiments 1 to 20, wherein the first cell specific configuration indicates at least one additional control channel common search space within the initial access bandwidth.

Embodiment 22: The method of any of embodiments 1 to 21, wherein the monitoring further comprises: monitoring the first control channel common search space, a second control channel common search space within the downlink bandwidth part, at least one additional control channel common search space within the initial access bandwidth, at least one additional control channel common search space within the downlink bandwidth part, or any combination thereof, for control information based at least in part on the dedicated signaling.

Embodiment 23: A method for wireless communication performed by a base station, comprising: performing an initial access procedure within an initial access bandwidth to provide a user equipment (UE) access to a cell of the base station; transmitting, during the initial access procedure, a first cell specific configuration of a first control channel common search space within the initial access bandwidth and an indication of a downlink bandwidth part; transmitting dedicated signaling associated with the downlink bandwidth part; and transmitting control information within at least one of the first control channel common search space, or a second control channel common search space within the downlink bandwidth part based at least in part on the dedicated signaling, or both (e.g., according to the dedicated signaling).

Embodiment 24: The method of embodiment 23, wherein the initial access bandwidth is included within a bandwidth of the downlink bandwidth part, and the initial access bandwidth and the downlink BWP each have a same subcarrier spacing.

Embodiment 25: The method of any of embodiments 23 to 24, further comprising: transmitting a first cell specific configuration indicating that the first control channel common search space is accessible after the initial access procedure, wherein the dedicated signaling provides a second cell specific configuration of the second control channel common search space within the downlink bandwidth part.

Embodiment 26: The method of any of embodiments 23 to 25, wherein the dedicated signaling indicates whether the first control channel common search space is accessible after the initial access procedure.

Embodiment 27: The method of any of embodiments 23 to 26, wherein the dedicated signaling indicates that the first control channel common search space is accessible after the initial access procedure and provides a second cell specific configuration of the second control channel common search space within the downlink bandwidth part.

Embodiment 28: The method of any of embodiments 24 to 27, wherein the dedicated signaling indicates that the first control channel common search space is accessible after the initial access procedure and does not include a second cell specific configuration of the second control channel common search space within the downlink bandwidth part.

Embodiment 29: The method of any of embodiments 24 to 28, wherein the dedicated signaling includes a second cell specific configuration of the second control channel common search space within the downlink bandwidth part.

Embodiment 30: The method of any of embodiments 24 to 29, wherein the dedicated signaling does not include a second cell specific configuration of the second control channel common search space within the downlink bandwidth part.

Embodiment 31: The method of any of embodiments 23 to 30, wherein the dedicated signaling includes a second cell specific configuration of the second control channel common search space within the downlink bandwidth part.

Embodiment 32: The method of any of embodiments 23 to 31, wherein the dedicated signaling indicates whether the first control channel common search space is accessible after the initial access procedure.

Embodiment 33: The method of embodiment 32, wherein the dedicated signaling includes a second cell specific configuration of the second control channel common search space within the downlink bandwidth part.

Embodiment 34: The method of any of embodiments 24 to 33, wherein the dedicated signaling indicates that the first control channel common search space is accessible after the initial access procedure and does not include a second cell specific configuration of the second control channel common search space within the downlink bandwidth part.

Embodiment 35: The method of any of embodiments 24 to 33, wherein the dedicated signaling includes a second cell specific configuration of the second control channel common search space within the downlink bandwidth part.

Embodiment 36: The method of any of embodiments 23 to 35, wherein a subcarrier spacing of the initial access bandwidth differs from a subcarrier spacing of the downlink bandwidth part.

Embodiment 37: The method of any of embodiments 23 to 36, wherein the initial access bandwidth is not entirely included within a bandwidth of the downlink bandwidth part.

Embodiment 38: The method of any of embodiments 23 to 37, wherein the control information schedules a system information block, other system information, paging, random access of a physical downlink shared channel, or any combination thereof.

Embodiment 39: The method of any of embodiments 23 to 38, wherein the dedicated signaling is radio resource control (RRC) signaling.

Embodiment 40: An apparatus comprising at least one means for performing a method of any of embodiments 1 to 22.

Embodiment 41: An apparatus for wireless communications comprising a processor; memory in electronic communication with the processor; and instructions stored in the memory and executable by the processor to cause the apparatus to perform a method of any of embodiments 1 to 22.

Embodiment 42: A non-transitory computer-readable medium storing code for wireless communications, the code comprising instructions executable by a processor to perform a method of any of embodiments 1 to 22.

Embodiment 43: An apparatus comprising at least one means for performing a method of any of embodiments 23 to 39.

Embodiment 44: An apparatus for wireless communications comprising a processor; memory in electronic communication with the processor; and instructions stored in the memory and executable by the processor to cause the apparatus to perform a method of any of embodiments 23 to 39.

Embodiment 45: A non-transitory computer-readable medium storing code for wireless communications, the code comprising instructions executable by a processor to perform a method of any of embodiments 23 to 39.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication performed by a user equipment (UE), comprising:
    performing an initial access procedure within an initial access bandwidth to obtain access to a cell;
    receiving, during the initial access procedure, a first cell specific configuration of a first control channel common search space within the initial access bandwidth and an indication of a downlink bandwidth part;
    receiving dedicated signaling associated with the downlink bandwidth part;
    monitoring at least one of the first control channel common search space, or a second control channel common search space within the downlink bandwidth part based at least in part on the dedicated signaling, or both, for control information; and
    wherein the dedicated signaling indicates that the first control channel common search space is accessible after the initial access procedure and provides a second cell specific configuration of the second control channel common search space within the downlink bandwidth part.

2. The method of claim 1, wherein the initial access bandwidth is included within a bandwidth of the downlink bandwidth part, and the initial access bandwidth and the downlink BWP each have a same subcarrier spacing.

3. The method of claim 1, wherein the monitoring further comprises:
    determining that the UE is configured to process at least one of the first control channel common search space, or the second control channel common search space, or both, based at least in part on the first cell specific configuration and the dedicated signaling.

4. The method of claim 1, wherein the first cell specific configuration indicates that the first control channel common search space is accessible after the initial access procedure and the dedicated signaling provides a second cell specific configuration of the second control channel common search space within the downlink bandwidth part.

5. The method of claim 1, wherein the dedicated signaling indicates whether the first control channel common search space is accessible after the initial access procedure.

6. The method of claim 1, wherein the monitoring further comprises:
    determining that the UE is to process only one of the first control channel common search space or the second control channel common search space based at least in part on the dedicated signaling.

7. The method of claim 6, wherein the determining further comprises:
    determining to process the first control channel common search space based at least in part on the dedicated signaling indicating that the first control channel common search space is accessible after the initial access procedure and determining that the dedicated signaling does not include a second cell specific configuration of the second control channel common search space within the downlink bandwidth part.

8. The method of claim 6, wherein the determining further comprises:
    determining that the UE is to process the second control channel common search space based at least in part on the dedicated signaling including a second cell specific configuration of the second control channel common search space within the downlink bandwidth part.

9. The method of claim 6, wherein the determining further comprises:
    determining to process the first control channel common search space based at least in part on determining that the dedicated signaling does not include a second cell specific configuration of the second control channel common search space within the downlink bandwidth part.

10. A method for wireless communication performed by a user equipment (UE), comprising:
    performing an initial access procedure within an initial access bandwidth to obtain access to a cell;
    receiving, during the initial access procedure, a first cell specific configuration of a first control channel common search space within the initial access bandwidth and an indication of a downlink bandwidth part;
    receiving dedicated signaling associated with the downlink bandwidth part;
    monitoring at least one of the first control channel common search space, or a second control channel common search space within the downlink bandwidth part based at least in part on the dedicated signaling, or both, for control information;
    wherein the monitoring comprises:
    determining that the UE is to process the second control channel common search space based at least in part on a subcarrier spacing of the initial access bandwidth differing from a subcarrier spacing of the downlink bandwidth part; and
    wherein the monitoring comprises:
    determining that the UE is to process only one of the first control channel common search space or the second control channel common search space based at least in part on the dedicated signaling.

11. A method for wireless communication performed by a user equipment (UE), comprising:
    performing an initial access procedure within an initial access bandwidth to obtain access to a cell;
    receiving, during the initial access procedure, a first cell specific configuration of a first control channel common search space within the initial access bandwidth and an indication of a downlink bandwidth part;
receiving dedicated signaling associated with the downlink bandwidth part;
monitoring at least one of the first control channel common search space, or a second control channel common search space within the downlink bandwidth part based at least in part on the dedicated signaling, or both, for control information;
wherein the monitoring comprises:
determining that the UE is to process the second control channel common search space based at least in part on the initial access bandwidth not being entirely included within a bandwidth of the downlink bandwidth part; and
wherein the monitoring comprises:
determining that the UE is to process only one of the first control channel common search space or the second control channel common search space based at least in part on the dedicated signaling.

12. The method of claim 1, wherein the control information schedules a system information block, other system information, paging, random access of a physical downlink shared channel, or any combination thereof.

13. The method of claim 1, wherein the dedicated signaling is radio resource control (RRC) signaling.

14. The method of claim 1, wherein the first cell specific configuration indicates at least one additional control channel common search space within the initial access bandwidth.

15. The method of claim 1, wherein the monitoring further comprises:
monitoring the first control channel common search space, a second control channel common search space within the downlink bandwidth part, at least one additional control channel common search space within the initial access bandwidth, at least one additional control channel common search space within the downlink bandwidth part, or any combination thereof, for control information based at least in part on the dedicated signaling.

16. A method for wireless communication performed by a base station, comprising:
performing an initial access procedure within an initial access bandwidth to provide a user equipment (UE) access to a cell of the base station;
transmitting, during the initial access procedure, a first cell specific configuration of a first control channel common search space within the initial access bandwidth and an indication of a downlink bandwidth part;
transmitting dedicated signaling associated with the downlink bandwidth part;
transmitting control information within at least one of the first control channel common search space, or a second control channel common search space within the downlink bandwidth part, or both, based at least in part on the dedicated signaling;
wherein the initial access bandwidth is included within a bandwidth of the downlink bandwidth part, and the initial access bandwidth and the downlink BWP each have a same subcarrier spacing; and
wherein the dedicated signaling indicates that the first control channel common search space is accessible after the initial access procedure and provides a second cell specific configuration of the second control channel common search space within the downlink bandwidth part.

17. The method of claim 16, further comprising:
transmitting a first cell specific configuration indicating that the first control channel common search space is accessible after the initial access procedure, wherein the dedicated signaling provides a second cell specific configuration of the second control channel common search space within the downlink bandwidth part.

18. The method of claim 16, wherein the dedicated signaling indicates whether the first control channel common search space is accessible after the initial access procedure.

19. The method of claim 16, wherein the dedicated signaling indicates that the first control channel common search space is accessible after the initial access procedure and does not include a second cell specific configuration of the second control channel common search space within the downlink bandwidth part.

20. The method of claim 16, wherein the dedicated signaling includes a second cell specific configuration of the second control channel common search space within the downlink bandwidth part.

21. The method of claim 16, wherein the dedicated signaling does not include a second cell specific configuration of the second control channel common search space within the downlink bandwidth part.

22. The method of claim 16, wherein a subcarrier spacing of the initial access bandwidth differs from a subcarrier spacing of the downlink bandwidth part.

23. The method of claim 16, wherein the initial access bandwidth is not entirely included within a bandwidth of the downlink bandwidth part.

24. The method of claim 16, wherein the control information schedules a system information block, other system information, paging, random access of a physical downlink shared channel, or any combination thereof.

25. The method of claim 16, wherein the dedicated signaling is radio resource control (RRC) signaling.

26. An apparatus for wireless communication performed by a user equipment (UE), comprising:
a processor,
memory in electronic communication with the processor;
instructions stored in the memory and executable by the processor to cause the apparatus to:
perform an initial access procedure within an initial access bandwidth to obtain access to a cell;
receive, during the initial access procedure, a first cell specific configuration of a first control channel common search space within the initial access bandwidth and an indication of a downlink bandwidth part;
receive dedicated signaling associated with the downlink bandwidth part; and
monitor at least one of the first control channel common search space, or a second control channel common search space within the downlink bandwidth part based at least in part on the dedicated signaling, or both, for control information; and
wherein the instructions to monitor are executable by the processor to cause the apparatus to:
determine that the UE is to process the second control channel common search space based at least in part on a subcarrier spacing of the initial access bandwidth differing from a subcarrier spacing of the downlink bandwidth part.

27. The apparatus of claim 26, wherein the initial access bandwidth is included within a bandwidth of the downlink bandwidth part, and the initial access bandwidth and the downlink BWP each have a same subcarrier spacing.

28. The apparatus of claim 26, wherein the instructions to monitor are further executable by the processor to cause the apparatus to:
  determine that the UE is to process only one of the first control channel common search space or the second control channel common search space based at least in part on the dedicated signaling.

29. The apparatus of claim 28, wherein the instructions to determine are further executable by the processor to cause the apparatus to:
  determine that the UE is to process the second control channel common search space based at least in part on the dedicated signaling including a second cell specific configuration of the second control channel common search space within the downlink bandwidth part.

30. An apparatus for wireless communication performed by a user equipment (UE), comprising:
  a processor,
  memory in electronic communication with the processor;
  instructions stored in the memory and executable by the processor to cause the apparatus to:
    perform an initial access procedure within an initial access bandwidth to obtain access to a cell;
    receive, during the initial access procedure, a first cell specific configuration of a first control channel common search space within the initial access bandwidth and an indication of a downlink bandwidth part;
    receive dedicated signaling associated with the downlink bandwidth part; and
    monitor at least one of the first control channel common search space, or a second control channel common search space within the downlink bandwidth part based at least in part on the dedicated signaling, or both, for control information; and
  wherein the instructions to monitor are further executable by the processor to cause the apparatus to:
    determine that the UE is to process the second control channel common search space based at least in part on the initial access bandwidth not being entirely included within a bandwidth of the downlink bandwidth part.

31. The apparatus of claim 26, wherein the control information schedules a system information block, other system information, paging, random access of a physical downlink shared channel, or any combination thereof.

32. The apparatus of claim 26, wherein the dedicated signaling is radio resource control (RRC) signaling.

33. The apparatus of claim 26, wherein the first cell specific configuration indicates at least one additional control channel common search space within the initial access bandwidth.

34. The apparatus of claim 26, wherein the instructions to monitor are further executable by the processor to cause the apparatus to:
  monitor the first control channel common search space, a second control channel common search space within the downlink bandwidth part, at least one additional control channel common search space within the initial access bandwidth, at least one additional control channel common search space within the downlink bandwidth part, or any combination thereof, for control information based at least in part on the dedicated signaling.

35. An apparatus for wireless communication performed by a base station, comprising:
  a processor,
  memory in electronic communication with the processor; and
  instructions stored in the memory and executable by the processor to cause the apparatus to:
    perform an initial access procedure within an initial access bandwidth to provide a user equipment (UE) access to a cell of the base station;
    transmit, during the initial access procedure, a first cell specific configuration of a first control channel common search space within the initial access bandwidth and an indication of a downlink bandwidth part;
    transmit dedicated signaling associated with the downlink bandwidth part;
    transmit control information within at least one of the first control channel common search space, or a second control channel common search space within the downlink bandwidth part, or both, based at least in part on the dedicated signaling;
  wherein the initial access bandwidth is included within a bandwidth of the downlink bandwidth part, and the initial access bandwidth and the downlink BWP each have a same subcarrier spacing; and
  wherein the dedicated signaling indicates that the first control channel common search space is accessible after the initial access procedure and provides a second cell specific configuration of the second control channel common search space within the downlink bandwidth part.

36. The apparatus of claim 35, wherein the dedicated signaling indicates that the first control channel common search space is accessible after the initial access procedure and does not include a second cell specific configuration of the second control channel common search space within the downlink bandwidth part.

37. The apparatus of claim 35, wherein the dedicated signaling includes a second cell specific configuration of the second control channel common search space within the downlink bandwidth part.

38. The apparatus of claim 35, wherein the initial access bandwidth is not entirely included within a bandwidth of the downlink bandwidth part.

39. The apparatus of claim 35, wherein the control information schedules a system information block, other system information, paging, random access of a physical downlink shared channel, or any combination thereof.

40. The apparatus of claim 35, wherein the dedicated signaling is radio resource control (RRC) signaling.

* * * * *